United States Patent
Smales

(10) Patent No.: US 11,017,067 B2
(45) Date of Patent: May 25, 2021

(54) METHOD AND SYSTEM FOR USER AUTHENTICATION WITH IMPROVED SECURITY

(71) Applicant: FORTICODE LIMITED, Melbourne (AU)

(72) Inventor: Antony Smales, Frankston (AU)

(73) Assignee: Forticode Limited, Victoria (AU)

( * ) Notice: Subject to any disclaimer, the term of this patent is extended or adjusted under 35 U.S.C. 154(b) by 87 days.

(21) Appl. No.: 16/085,768

(22) PCT Filed: Mar. 17, 2017

(86) PCT No.: PCT/AU2017/050240
§ 371 (c)(1),
(2) Date: Sep. 17, 2018

(87) PCT Pub. No.: WO2017/156590
PCT Pub. Date: Sep. 21, 2017

(65) Prior Publication Data
US 2019/0034612 A1    Jan. 31, 2019

(30) Foreign Application Priority Data
Mar. 18, 2016   (AU) ................................ 2016901019

(51) Int. Cl.
*G06F 11/30* (2006.01)
*G06F 12/14* (2006.01)
(Continued)

(52) U.S. Cl.
CPC .............. *G06F 21/32* (2013.01); *G06F 21/34* (2013.01); *H04L 9/3228* (2013.01);
(Continued)

(58) Field of Classification Search
CPC .......... G06F 21/31; G06F 21/32; G06F 21/34; G06F 21/46; G06F 2221/2103;
(Continued)

(56) References Cited

U.S. PATENT DOCUMENTS 5,592,553 A * 1/1997 Guski ................... H04L 9/3228
713/159
8,869,255 B2 * 10/2014 Smales ................... G06F 21/31
726/7
(Continued)

OTHER PUBLICATIONS

International Search Report for PCT/AU2017/050240, dated Jun. 13, 2017, 2 pages.

*Primary Examiner* — Samson B Lemma
(74) *Attorney, Agent, or Firm* — Nixon & Vanderhye, P.C.

(57) ABSTRACT

A user authentication method in a distributed processing system commences by receiving, at a first processing unit (108), a request (1004) to initiate an authentication session, wherein the request includes a unique identifier of a user requiring authentication. The first processing unit acquires at least one item of authentication data (412, 1712), which is valid during the authentication session. The authentication data is transmitted (1006) to a second processing unit (106) which is associated with a terminal device operated by the user. The second processing unit transforms the authentication data using a transformation algorithm based upon one or more session-specific authentication factors (404, 1704), to generate transformed authentication data that is characteristic of the authentication session and of the user. The transformed authentication data is transmitted (1008) to a third processing unit (108) which verifies that the transformed authentication data corresponds with the user and with predetermined values of the one or more session-specific authentication factors. The third processing unit (Continued)

generates an authentication result (1010) of the authentication session based upon the verification.

10 Claims, 15 Drawing Sheets

(51) Int. Cl.
| | | |
|---|---|---|
| *G06F 21/32* | (2013.01) | |
| *H04W 12/06* | (2021.01) | |
| *H04L 9/32* | (2006.01) | |
| *H04L 29/06* | (2006.01) | |
| *H04W 12/00* | (2021.01) | |
| *H04W 12/63* | (2021.01) | |
| *H04W 12/71* | (2021.01) | |
| *H04W 12/72* | (2021.01) | |
| *H04W 12/73* | (2021.01) | |
| *G06F 21/34* | (2013.01) | |
| *H04W 12/60* | (2021.01) | |

(52) U.S. Cl.
CPC .......... *H04L 9/3231* (2013.01); *H04L 9/3247* (2013.01); *H04L 9/3271* (2013.01); *H04L 9/3297* (2013.01); *H04L 63/0861* (2013.01); *H04W 12/00* (2013.01); *H04W 12/06* (2013.01); *H04W 12/63* (2021.01); *H04W 12/71* (2021.01); *H04W 12/72* (2021.01); *H04W 12/73* (2021.01); *G06F 2221/2103* (2013.01); *H04L 2209/80* (2013.01); *H04L 2463/082* (2013.01); *H04W 12/60* (2021.01)

(58) Field of Classification Search
CPC ............. H04L 2209/80; H04L 63/0861; H04L 9/3231; H04L 9/3247; H04L 9/3271; H04L 9/3297; H04L 9/3226; H04W 12/005; H04W 12/00503; H04W 12/00512; H04W 12/00514; H04W 12/00516; H04W 12/06
USPC .................................................. 713/168, 189
See application file for complete search history.

(56) References Cited

U.S. PATENT DOCUMENTS

| | | | |
|---|---|---|---|
| 9,519,764 B2* | 12/2016 | Smales | G06F 21/31 |
| 2011/0197266 A1* | 8/2011 | Chu | H04L 9/3228 |
| | | | 726/5 |
| 2013/0124292 A1* | 5/2013 | Juthani | G06F 21/31 |
| | | | 705/14.26 |
| 2014/0040628 A1* | 2/2014 | Fort | G06F 21/34 |
| | | | 713/182 |
| 2014/0222955 A1* | 8/2014 | Islam | G06F 21/31 |
| | | | 709/217 |
| 2015/0040204 A1* | 2/2015 | Smales | G06F 21/31 |
| | | | 726/7 |

* cited by examiner

METHOD AND SYSTEM FOR USER AUTHENTICATION WITH IMPROVED SECURITY

This application is the U.S. national phase of International Application No. PCT/AU2017/050240 filed 17 Mar. 2017, which designated the U.S. and claims priority to AU Patent Application No. 2016901019 filed 18 Mar. 2016, the entire contents of each of which are hereby incorporated by reference.

FIELD OF THE INVENTION

The present invention relates generally to authentication systems and methods, and more particularly to multifactor authentication systems with improved security and flexibility.

BACKGROUND OF THE INVENTION

Reliable and secure authentication of personal identity is an essential element of many online systems. Commonly, an authorised user of an online system or service is required to provide at least a user identifier, e.g. a user name or code, and an additional 'secret' code, such as a password or personal identification number (PIN). A PIN or password is an example of a knowledge factor, whereby the user is required to prove knowledge of the secret, i.e. password, phrase or PIN, for authentication.

Knowledge factors are susceptible to attack, e.g. by eavesdropping. The most basic form of eavesdropping may involve observing a user when entering a password or PIN. Observation may be performed directly, or may involve the use of a concealed camera. More technologically sophisticated eavesdropping techniques include so called 'man-in-the-middle' attacks, in which malicious software is installed in terminal equipment and/or intermediate network nodes, targeting system components in which unencrypted passwords may be accessed in transit. Users may also be deceived into revealing knowledge factors, e.g. via phishing attacks.

Authentication methods with enhanced security include two-factor authentication, in which the user is required to provide one or more additional factors as proof of identity. For example, possession factors ('something the user has') are most commonly used, in addition to knowledge factors. Examples of possession factors include credit cards and the like, which must be presented in conjunction with a PIN in order to gain access to a transaction system. Other forms of possession factor include disconnected tokens, which display periodically-updated random numbers for entry by the user, and uniquely identifiable personal items, such as cellular mobile phones or smartphones. Possession factors significantly increase security, but are nonetheless susceptible to theft and replication (e.g. card skimming).

Improvements in the security of knowledge factors, providing additional protection against eavesdropping, are disclosed in the present inventor's commonly assigned U.S. Pat. Nos. 8,869,255 and 9,519,764, both of which are incorporated herein in their entirety by reference. Such systems may be further enhanced through the use of additional factors, such as possession factors. However, there remains scope for further improvement to authentication systems and methods. For example, it may be desirable to control or restrict access to a secure system based on factors other than user identity. For example, it may be desirable to ensure that users can only access a secure system using authorised devices, and/or to ensure that access can only be gained while the user is in a secure location. At the same time, it may be desirable to ensure that user credentials and other factors cannot be acquired by eavesdropping, such as man-in-the-middle attacks. Preferably, such additional security is provided in a manner that is transparent to end-users, such that there is no additional inconvenience or impediment presented to legitimate, authorised, users.

It is, accordingly, an object of the present invention to address the foregoing need for enhanced authentication systems and methods.

SUMMARY OF THE INVENTION

In one aspect, the invention provides a user authentication method comprising execution, by a distributed processing system, of the steps of:

receiving, at a first processing unit, a request to initiate an authentication session, the request comprising a unique identifier of a user requiring authentication;

the first processing unit acquiring at least one item of authentication data, valid during the authentication session;

transmitting the authentication data to a second processing unit which is associated with a terminal device operated by the user;

the second processing unit transforming the authentication data using a transformation algorithm based upon one or more session-specific authentication factors, to generate transformed authentication data that is characteristic of the authentication session and of the user;

transmitting the transformed authentication data to a third processing unit;

the third processing unit verifying that the transformed authentication data corresponds with the user and with predetermined values of the one or more session-specific authentication factors; and the third processing unit generating an authentication result of the authentication session based upon the verification.

Advantageously, the use of session-specific authentication factors in the transformation of authentication data enables information associated with a current context of the authentication session to be incorporated into user verification. For example, the second processing unit may comprise instruction code executing on a processor of a portable personal device operated by the user, such as a dedicated digital access device running suitable software or, conveniently, a smartphone or other personal device having an installed application (i.e. an 'app') providing the required instruction code embodying an aspect of the invention. Accordingly, the current context information may comprise values corresponding with factors such as a geographic location of the device, a Service Set Identifier (SSID) of a wireless network visible to the device, and/or a unique identifier associated with the device. More generally, any context-specific information accessible to software code executing on the device may be employed as a session-specific authentication factor.

In some embodiments, a secret keyword (e.g. a password or passphrase) is associated with the user, the secret keyword consisting of an ordered sequence of symbols selected from a predetermined symbol set, and wherein:

the at least one item of authentication data includes a security matrix comprising a mapping between each symbol within the symbol set and a code value which is specific to the authentication session and which is selected from a code set which is distinct from the symbol set;

the security matrix is transformed by the first processing unit using a transformation algorithm based upon the predetermined values of the one or more session-specific authentication factors, to generate a transformed security matrix comprising the symbol set and transformed code values;

the transformation algorithm of the second processing unit includes an inverse transformation algorithm configured to recover the code values of the security matrix, and a user input step for receiving a sequence of code values selected from the security matrix and input by the user, the code values corresponding with the secret keyword; and the verifying step comprises validating the sequence of code values received in the user input step by comparison with an expected sequence of code values corresponding with the secret keyword and a mapping thereof to the code values in the security matrix.

In such embodiments, the session-specific authentication factors are applied to 'encode' the mapping between symbol and code values in a keyword-based user authentication method of the type disclosed in commonly assigned U.S. Pat. Nos. 8,869,255 and 9,519,764. The second processing unit (e.g. a portable personal device operated by the user) must therefore determine and apply the same context-based values of the session-specific authentication factors in order to correctly 'decode' the mapping. For example, if a location-based authentication factor is applied, the first processing unit will use a predetermined value of this factor, such as the GPS coordinates of a location at which the user may be successfully authenticated, to encode the mapping. The portable device (i.e. second processing unit) will determine its own location, for example by using in-built GPS receiver hardware, and apply the resulting coordinates to decode the mapping. The device does not know the value of the GPS coordinates used to encode the mapping, but will only obtain the correct decoded mapping if its own location matches those coordinates. The user will thus only be able to successfully authenticate when present at the authorised location.

In alternative embodiments, the authentication data comprises a session-specific one-time code word which is encrypted by the first processing unit using a transformation algorithm parameterised by the predetermined values of the one or more session-specific authentication factors;

the transformation algorithm of the second processing unit includes an inverse transformation algorithm configured to decrypt the session-specific one-time code word, and a cryptographic signing step wherein a private cryptographic key of the user is applied to generate the transformed authentication data which comprises a signed copy of the session-specific one-time code word;

the verifying step comprises a cryptographic verification wherein a public cryptographic key of the user is applied to confirm that the signed copy of the session-specific one-time code word was generated by the second processing unit associated with the terminal device operated by the user.

A particular advantage of such embodiments is that session-specific authentication factors may be applied independently of any requirement for the user to provide a secret keyword (e.g. password or pass phrase) in order to access a secure system. In an exemplary scenario, a user may wish to access an online service, such as a remote desktop service provided by an employer, but may be restricted from doing so other than in an approved location, such as a home office. Upon an attempt by the user to log in to the service, the second processing unit (e.g. an authentication server) may generate a session-specific one-time code word (i.e. a nonce) such as, for example, a 256-bit or 512-bit random number. It may then encrypt the nonce using a symmetric encryption algorithm in which a key is derived from a predetermined value of a session-specific authentication factor, such as the GPS coordinates of the user's home office. Upon receiving the resulting authentication data, the user's portable device (i.e. second processing unit) will determine its own location and apply the resulting coordinates to generate a key for use in the symmetric encryption algorithm in order to decrypt the nonce. The device does not know the value of the GPS coordinates used to generate the original encryption key, but will only successfully decrypt the nonce if its own location matches those coordinates. By signing the resulting decrypted nonce with a stored private key, the device enables subsequent verification that it was able to successfully decrypt the nonce. The user will thus only be able to successfully authenticate when present, with their portable device, at the authorised location.

In another aspect, the invention provides an authentication system comprising:

a processor;

a network interface, operatively associated with the processor; and at least one computer-readable storage device, accessible by the processor, wherein the storage device comprises instruction code executable by the processor and configured to cause the processor to implement a method comprising the steps of:

receiving, via the network interface, a request to initiate an authentication session, the request comprising a unique identifier of a user requiring authentication;

acquiring at least one item of authentication data, valid during the authentication session;

transmitting, via the network interface, the authentication data to a processing unit associated with a terminal device operated by the user; and receiving, via the network interface, transformed authentication data generated by the processing unit associated with the terminal device operated by the user, wherein the transformed authentication data is characteristic of the authentication session and of the user, wherein the transformed authentication data is configured to enable verification that it corresponds with the user and with predetermined values of the one or more session-specific authentication factors, whereby an authentication result may be generated for the authentication session based upon the verification.

In some embodiments, the instruction code executable by the processor is configured to cause the processor to implement the step of acquiring the at least one item of authentication data by:

generating a session-specific one-time code word;

retrieving, from the at least one computer-readable storage device, the predetermined values of the one or more session-specific authentication factors; and encrypting the one-time code word using a transformation algorithm parameterised by the predetermined values of the one or more session-specific authentication factors.

The transformed authentication data may be configured to enable verification by confirming that it corresponds with the session-specific one-time code word that has been cryptographically signed using a private cryptographic key of the user.

In yet another aspect, the invention provides a portable personal authentication device comprising:

a processor;

a network interface, operatively associated with the processor; and at least one computer-readable storage device, accessible by the processor, wherein the storage device comprises instruction code executable by the processor and configured to cause the processor to implement a method, in an authentication session of a user of the authentication device, comprising the steps of:

receiving, via the network interface from an authentication system, authentication data that is valid during the authentication session;

transforming the authentication data using a transformation algorithm based upon one or more session-specific authentication factors, to generate transformed authentication data that is characteristic of the authentication session and of the user;

transmitting, via the network interface to the authentication system, the transformed authentication data, wherein the transformed authentication data is configured to enable verification that it corresponds with the user and with predetermined values of the one or more session-specific authentication factors, whereby an authentication result may be generated for the authentication session based upon the verification.

In embodiments of the invention, the authentication data comprises an encrypted session-specific one-time code word, and the instruction code executable by the processor is configured to cause the processor to implement the step of transforming the authentication data by:

determining values of the one or more session-specific authentication factors that are based upon a current context of the portable personal authentication device;

applying an algorithm parameterised by the determined values of the one or more session-specific authentication factors to decrypt the authentication data and recover the session-specific one-time code word; and applying a private cryptographic key of the user, which is held in secure storage of the portable personal authentication device, to generate a signed copy of the of the session-specific one-time code word for transmission to the authentication system.

In a further aspect, the invention provides a tangible computer-readable medium comprising stored program instructions which, when executed by a processor of an authentication system, cause the authentication system to implement a method comprising the steps of:

receiving, via a network interface of the authentication system, a request to initiate an authentication session, the request comprising a unique identifier of a user requiring authentication;

acquiring at least one item of authentication data, valid during the authentication session;

transmitting, via the network interface, the authentication data to a processing unit associated with a terminal device operated by the user; and receiving, via the network interface, transformed authentication data generated by the processing unit associated with the terminal device operated by the user, wherein the transformed authentication data is characteristic of the authentication session and of the user, wherein the transformed authentication data is configured to enable verification that it corresponds with the user and with predetermined values of the one or more session-specific authentication factors, whereby an authentication result may be generated for the authentication session based upon the verification.

In still another aspect, the invention provides a tangible computer-readable medium comprising stored program instructions which, when executed by a processor of a portable personal identification device, cause the device to implement a method comprising the steps of:

receiving, via a network interface of the device from an authentication system, authentication data that is valid during the authentication session;

transforming the authentication data using a transformation algorithm based upon one or more session-specific authentication factors, to generate transformed authentication data that is characteristic of the authentication session and of the user;

transmitting, via the network interface to the authentication system, the transformed authentication data, wherein the transformed authentication data is configured to enable verification that it corresponds with the user and with predetermined values of the one or more session-specific authentication factors, whereby an authentication result may be generated for the authentication session based upon the verification.

Further aspects, advantages, and features of embodiments of the invention will be apparent to persons skilled in the relevant arts from the following description of various embodiments. It will be appreciated, however, that the invention is not limited to the embodiments described, which are provided in order to illustrate the principles of the invention as defined in the foregoing statements and in the appended claims, and to assist skilled persons in putting these principles into practical effect.

BRIEF DESCRIPTION OF THE DRAWINGS

Embodiments of the invention will now be described with reference to the accompanying drawings, in which like reference numerals indicate like features, and wherein.

DETAILED DESCRIPTION OF EMBODIMENTS

Figure 1:
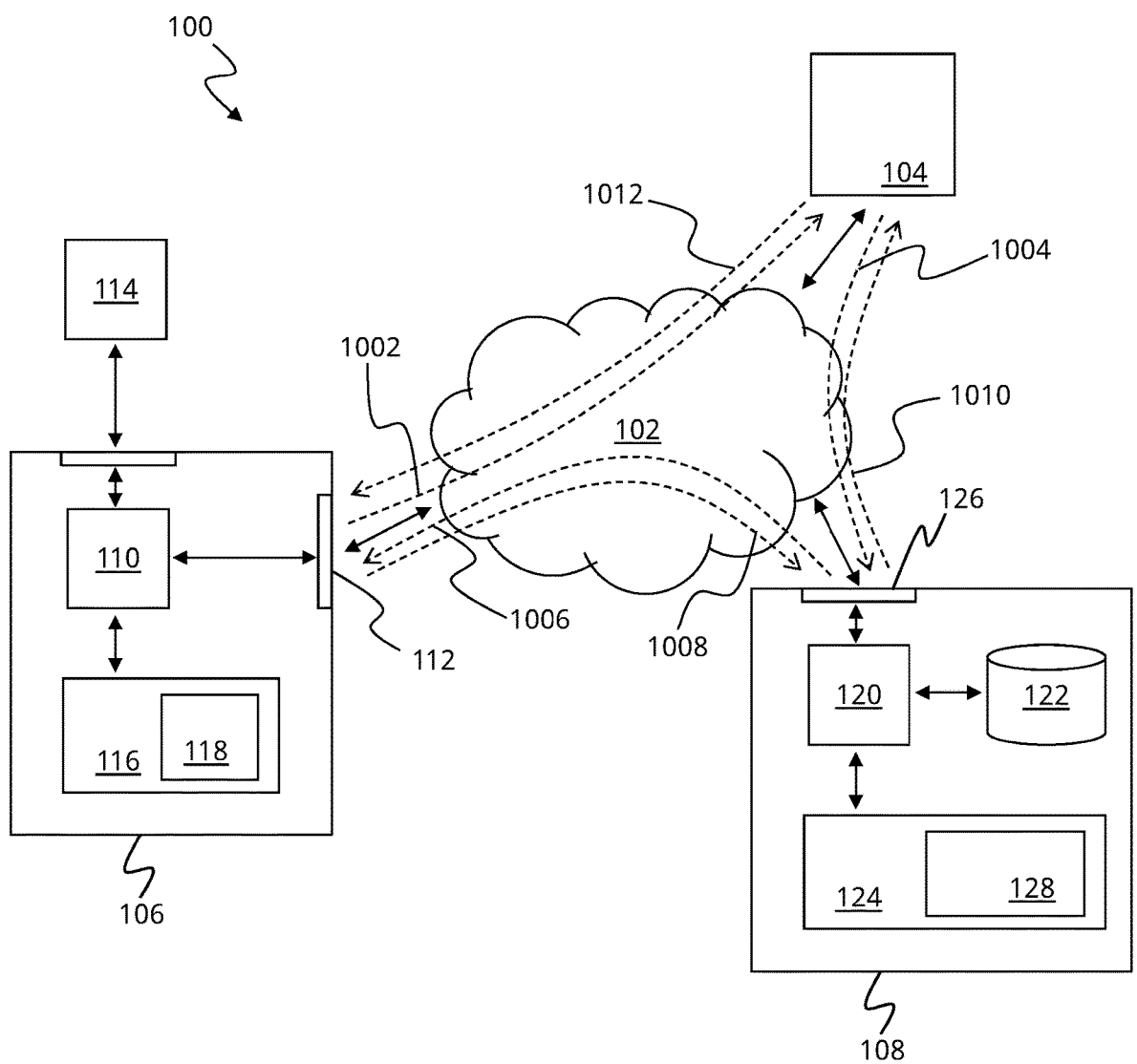
FIG. 1 is a schematic diagram illustrating an exemplary system embodying the invention.

FIG. 1 is a block diagram illustrating a system 100 embodying the present invention. A public communications network 102, such as the Internet, is employed for messaging between a secure system 104, one or more user endpoint devices 106, and an authentication server 108. Generally speaking, the user endpoint devices 106 may be any suitable computing, communications and/or processing appliances having the ability to communicate via the Internet 102, for example using web browser software and/or other connected applications. Endpoint devices 106 may also comprise other types of terminal apparatus, such as cash dispensing machines (e.g. ATMs), point-of-sale (POS) terminals, vending machines, and so forth. Furthermore, while the exemplary system 100 comprises a single shared, insecure, network 102 for communications between all processing devices and systems, embodiments of the invention may include other types of communications and/or transaction networks, such as financial transaction networks, private networks, virtual private networks (VPNs), cellular telephony networks, or a mix of these and/or other forms of communications systems.

In this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Hardware may include conventional personal computer architectures, or other general-purpose hardware platforms. Software may include commercially available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the present invention, for ease of explanation and understanding the exemplary embodiments described herein are based upon single-processor general-purpose computing platforms, commonly available operating system platforms, and/or widely available consumer products, such as desktop PCs, notebook or laptop PCs, smartphones, tablet computers, and so forth.

In particular, the term 'processing unit' is used in this specification (including the claims) to refer to any suitable combination of hardware and software configured to perform a particular defined task, such as generating and transmitting authentication data, receiving and processing authentication data, or receiving and validating authentication data. Such a processing unit may comprise an executable code module executing at a single location on a single processing device, or may comprise cooperating executable code modules executing in multiple locations and/or on multiple processing devices. For example, in some embodiments of the invention authentication processing may be performed entirely by code executing on authentication server 108, while in other embodiments corresponding processing may be performed cooperatively by code modules executing on secure system 104 and authentication server 108. For example, embodiments of the invention may employ application programming interface (API) code modules, installed at the secure system 104, or at another third-party system, configured to operate cooperatively with code modules executing on authentication server 108 in order to provide the secure system 104 with authentication services.

Software components embodying features of the invention may be developed using any suitable programming language, development environment, or combinations of languages and development environments, as will be familiar to persons skilled in the art of software engineering. For example, suitable software may be developed using the C programming language, the Java programming language, the C++ programming language, the Go programming language, and/or a range of languages suitable for implementation of network or web-based services, such as JavaScript, HTML, PHP, ASP, JSP, Ruby, Python, and so forth. These examples are not intended to be limiting, and it will be appreciated that convenient languages or development systems may be employed, in accordance with system requirements.

In the exemplary system 100, the endpoint devices 106 each comprise a processor 110. The processor 110 is interfaced to, or otherwise operably associated with, a communications interface 112, one or more user input/output (I/O) interfaces 114, and local storage 116, which may comprise a combination of volatile and non-volatile storage. Non-volatile storage may include solid-state non-volatile memory, such as read only memory (ROM) flash memory, or the like. Volatile storage may include random access memory (RAM). The storage 116 contains program instructions and transient data relating to the operation of the endpoint device 106. In some embodiments, the endpoint device 106 may include additional peripheral interfaces, such as an interface to high-capacity non-volatile storage, such as a hard disk drive, optical drive, and so forth (not shown in FIG. 1).

The endpoint device storage 116 may contain program and data content relevant to the normal operation of the device 106. This may include operating system programs and data (e.g. associated with a Windows, Android, iOS, or MacOS operating system), as well as other executable application software generally unrelated to the present invention. The storage 116 also includes program instructions 118 which, when executed by the processor 110 instruct the endpoint device 106 to perform operations relating to an embodiment of the invention, for example such as are described below with reference to FIGS. 3, 6, 7, 11 and 14.

As also shown in FIG. 1, the authentication server 108 comprises a processor 120. The processor 120 is interfaced to, or otherwise operably associated with a non-volatile memory/storage device 122, which may be a hard disk drive, and/or may include a solid-state non-volatile memory, such as ROM, flash memory, or the like. The processor 120 is also interfaced to volatile storage 124, such as RAM, which contains program instructions and transient data relating to the operation of the authentication server 108.

In a conventional configuration, the storage device 122 maintains known program and data content relevant to the normal operation of the authentication server 108. For example, the storage device 122 may contain operating system programs and data, as well as other executable application software necessary for the intended functions of the authentication server 108. The storage device 122 also contains program instructions which, when executed by the processor 120, instruct the authentication server 108 to perform operations relating to an embodiment of the present invention, such as are described in greater detail below with reference to FIGS. 2, 4, 5 and 6. In operation, instructions and data held on the storage device 122 are transferred to volatile memory 124 for execution on demand.

The processor 120 is also operably associated with a communications interface 126 in a conventional manner. The communications interface 126 facilitates access to the data communications network 102.

In use, the volatile storage 124 contains a corresponding body 128 of program instructions transferred from the storage device 122 and configured to perform processing and other operations embodying features of the present invention.

The secure system 104 may be any computing or processing system requiring authentication of end-users prior to permitting access and/or the performance of transactions on behalf of those users. Secure systems that may employ the services provided by embodiments of the invention include, but are not limited to, banking systems (e.g. online banking portals), e-commerce payment portals, secure computing platforms (e.g. government or employer systems), and other systems requiring secure authentication of users.

Broken lines shown in the system 100 represent communications between an endpoint device 106, a secure system 104, and an authentication server 108, embodying the present invention. Details of these communications are provided below, and particularly with reference to FIGS. 10 and 22. For present purposes, with reference to FIG. 1, a brief overview is now provided.

An end-user requiring access to a secure system 104 may use either an endpoint device 106, or an alternative mechanism, to initiate an access request 1002. The secure system 104 uses services provided by the authentication server 108 in order to determine whether or not to provide the end-user with the requested access. As such, an authorisation request 1004 is transmitted by the secure system 104 to the authentication server 108.

The authentication server 108 generates and transmits a challenge message 1006 to the endpoint device 106. The challenge message may be transmitted directly from the authentication server 108 to the endpoint device 106, or may be transmitted indirectly, for example via the secure system 104. The manner of routing the challenge message 1006 is not critical to the general operation of embodiments of the invention.

The user is prompted for input in response to the challenge message, and a corresponding response 1008 is transmitted back to the authentication server 108. The authentication server 108 validates the response, and returns an authorisation result 1010 to the secure system 104. Depending upon the authorisation result, the secure system 104 may transmit an access response 1012, either granting or denying access to the end-user via the endpoint device 106. Alternatively, in some embodiments the requested access may be granted via another mechanism, as described below with reference to FIG. 22.

Figure 2:
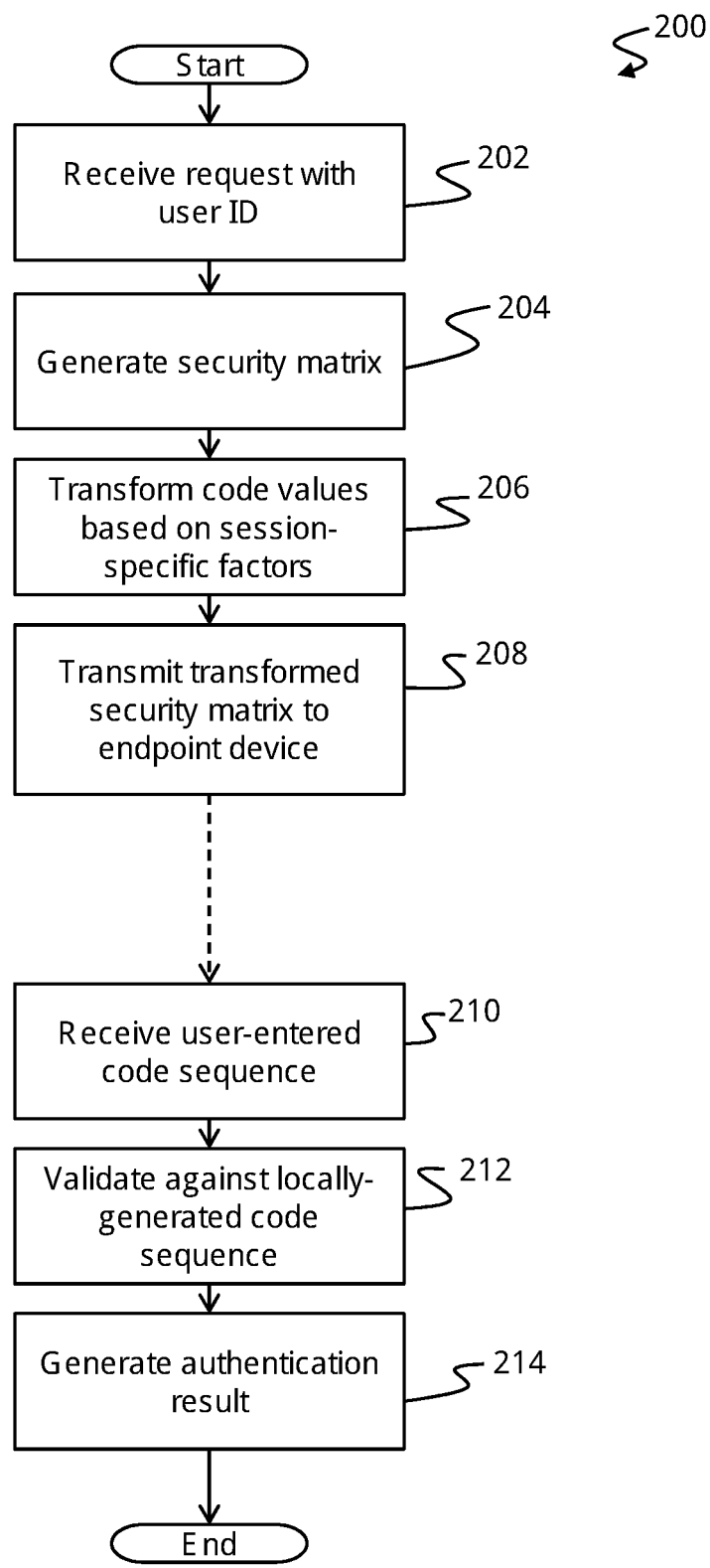
FIG. 2 is a flowchart of a user authentication method performed at an authentication server according to a first embodiment of the invention.

FIG. 2 is a flowchart 200 showing further details of a user authentication method according to a first embodiment of the invention, from the perspective of the authentication server 108. At step 202 the authentication server 108 receives an authorisation request from the secure system 104, which includes identifying information of the end-user, such as a user name or other user ID.

At step 204, the authentication server 108 generates a security matrix which is a 'one-time' mapping between members of a predetermined symbol set and a distinct code set. In general, the symbol set comprises a plurality of symbols, from which end-users are able to construct key words or phrases, such as passwords, or other sequences of symbols from the set used for authentication purposes. For example, the symbol set may comprise letters of the alphabet (upper- and/or lower-case), numerals, and/or selected punctuation and other special characters.

In general, the code set is a distinct plurality of code values. Preferably, the number of members of the code set is smaller than the number of members of the symbol set. The code set may be, for example, the set of decimal digits zero to nine, having the advantage that all of these code values can be entered by a user using only a PIN pad or numeric keypad.

In general, therefore, the mapping represented by the security matrix generated at step 204 is not 'one-to-one', and each code value may be mapped to multiple symbols of the symbol set. Accordingly, by creating a one-time mapping, e.g. via a random or pseudorandom process, it is not possible for any eavesdropper or observer of the communications messages passing between the endpoint device 106 and the authentication server 108, or overlooking the actions of the end-user, to uniquely determine the keyword or phrase used for user authentication in any single observation. Furthermore, since a new security matrix is generated for each authentication instance, simply re-entering a code previously entered by the authorised user will not subsequently result in successful authentication.

The above method of authentication using one-time security matrices is also employed in the systems disclosed in the present inventor's commonly assigned U.S. Pat. Nos. 8,869,255 and 9,519,764, both of which are incorporated herein in their entirety by reference.

At step 206, the authentication server 108 transforms the code values in the security matrix based upon one or more session-specific factors. Further discussion of this step is provided below, with reference to FIG. 4.

Following transformation of the code values, the authentication server 108 constructs and transmits a challenge message comprising the transformed security matrix, and other relevant information, to the endpoint device 106. This step is discussed in greater detail below with reference to FIG. 5.

At step 210, the authentication server 108 receives a challenge response message from the endpoint device 106. The challenge response message corresponds with input provided by the end-user. In the event that the endpoint device 106 has successfully inverted the transformation performed by the authentication server 108 at step 206, and the user has then entered a correct sequence of code values, the authentication server 108 will be able to reproduce the same code sequence based upon a copy of the user's keyword held within a database accessible to the authentication server processor 120. Further details of user records maintained in the database are discussed below with reference to FIG. 12.

Accordingly, at step 212 the authentication server 108 validates the received code sequence against a corresponding locally generated code sequence. From this, an authentication result 214 is generated. In the case of a match between the received code sequence and the locally generated code sequence, a positive authentication result is generated, and transmitted to the secure system 104. Otherwise, a negative authentication result is generated and transmitted to the secure system 104. Based upon this authentication result, the secure system 104 is able to grant or deny access to the end-user, via the endpoint device 106.

Figure 3:
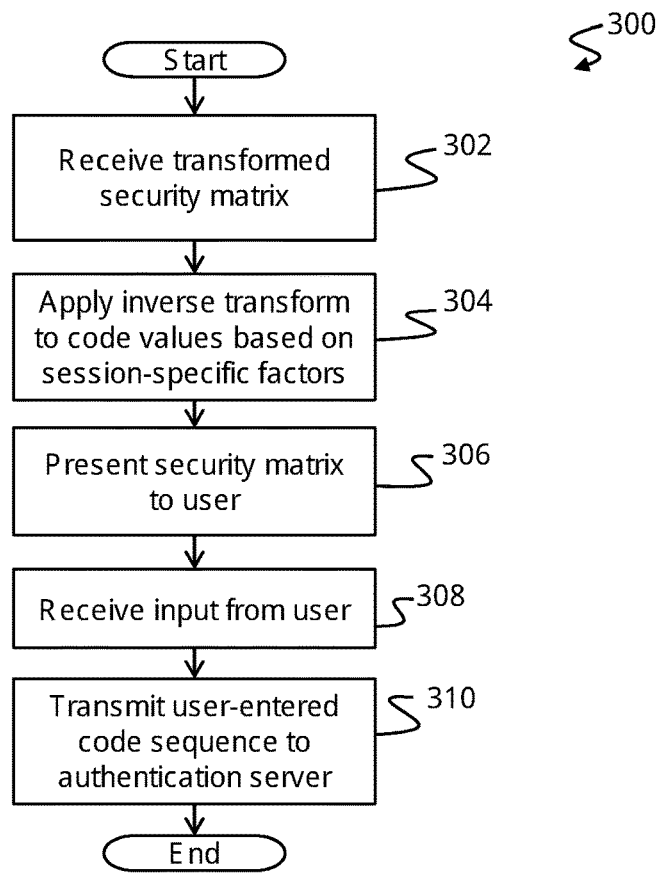
FIG. 3 is a flowchart of a user authentication method performed at an endpoint device according to the first embodiment.

Turning now to FIG. 3, there is shown a flowchart 300 of a user authentication method as performed at an endpoint device embodying the invention. The method 300 is performed by the endpoint device 106 in order to receive and respond to the challenge message generated by the authentication server 108 at step 208.

In particular, at step 302 the endpoint device 106 receives the challenge message including the transformed security matrix from the authentication server 108. At step 304, the endpoint device 106 applies the same session-specific factors employed by the authentication server 108 at step 206 in order to apply an inverse transformation to the transformed code values. Having performed this inverse transformation, the endpoint device 106 has regenerated the original mapping between symbols of the symbol set and code values of the code set, according to the original security matrix generated at step 204.

At step 306, the original security matrix is presented to the user, for example via a display of the I/O devices 114 of the endpoint device 106. The user is enabled to respond to the displayed security matrix, which is typically accompanied by a suitable prompt, by entering a sequence of code values corresponding with the mappings and the user's personal keyword (password, passphrase, or other sequence of symbols selected from the symbol set). User input is received by the endpoint device 106 at step 308, which then generates and transmits a message containing the entered code sequence back to the authentication server 108. This message is received at step 210, as discussed above with reference to FIG. 2.

Figure 4:
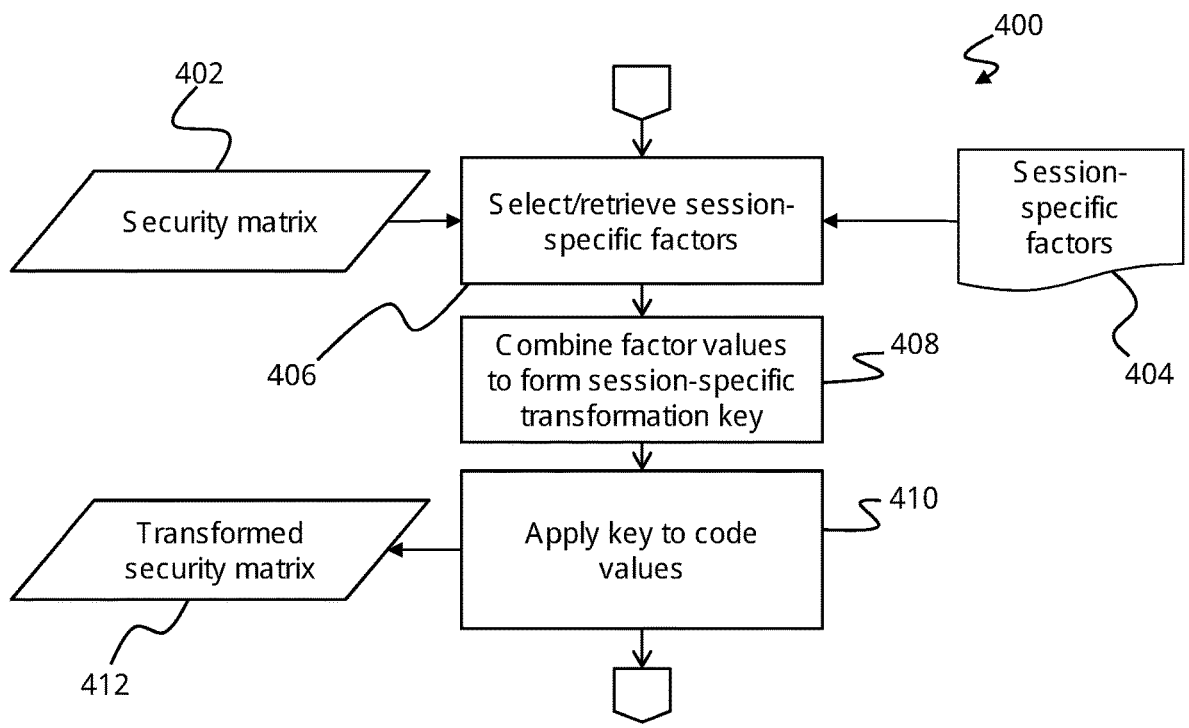
FIG. 4 is a flowchart of a session-specific transformation process according to the first embodiment.

FIG. 4 shows a flowchart 400 illustrating a session-specific transformation process, e.g. as carried out by the authentication server 108 at step 206, according an embodiment of the invention. The input to the process 400 is the security matrix 402, as generated at step 204. In particular, at step 406 one or more session-specific factors 404 is identified and selected or retrieved. The session-specific factors typically depend upon the requirements of the secure system 104. Accordingly, the session-specific factors may be retrieved from a database record that is associated with the secure system 104. The session-specific factors may also depend upon other characteristics of the current session, such as the particular user, the location of the endpoint device, the time/date, and/or any other identifiable properties of the session.

According to the presently described embodiment of the invention, therefore, one or more session-specific factors are retrieved from a record 406 matching the predefined properties of the present session. In particular, corresponding values of the session-specific factors are retrieved, or determined, for use in the transformation method 400. Examples of factor types and values that may be employed in embodiments of the invention include, but are not limited to:

the present user, represented by the user ID;
endpoint device location, represented by GPS coordinates determined to a specified precision;
a predetermined device- or user-specific key, which has been pre-agreed and stored at both the endpoint device 106 and the authentication server 108, such as a digital certificate, or a random value generated during a user or device registration process;
one or more unique identifying values associated with the endpoint device 106, such as a network interface (MAC) address, a Wi-Fi station ID, an Internet protocol version 6 (IPv6) address, a mobile telephony number, SIM identifier, or other hardware device (e.g. CPU) serial number;
a changing value generated according to an algorithm shared by the endpoint device 106 and the authentication server 108, such as a pseudorandom sequence based upon a seed generated during a user or device registration process;
one or more Service Set Identifiers (SSIDs) of wireless networks visible to the endpoint device 106, and/or a number of visible SSIDs;
an SSID of a wireless network to which the endpoint device 106 is presently connected;
identifying information of a mobile cellular carrier to which the endpoint device 106 is connected;
time and/or date;
data provided by a local beacon or network-attached device accessible to the endpoint device 106 at the time/place of authentication;
biometric data, e.g. from a fingerprint reader of the endpoint device 106 and/or facial identification/classification data obtained from an image captured by a camera of the endpoint device 106;

At step 408, the factor values retrieved or determined at step 404 are combined to form a session-specific transformation/encryption key. Any suitable algorithm may be used to combine the factors. For example, the combined factors may comprise a concatenation of values of one or more session-specific factors, a hash generated from the values of the one or more session-specific factors, or any other suitable function producing an output that is based upon all of the input session-specific factor values.

The combined result may further be employed in any suitable manner in order to transform the code values of the security matrix 402. For example, the combined value may be used as an encryption key in a symmetric encryption algorithm applied to the code values. For example, a simple symmetric transformation/encryption algorithm is to compute a transformed code sequence by a bitwise exclusive OR (XOR) operation between the code values and the key value. More sophisticated symmetric ciphers include DES, 3DES, AES-256, AES-512, and Blowfish. Suitable keys for use with such ciphers may be derived from combined session-specific factors values by use of a suitable hashing function, such as—without limitation—SHA-256 or SHA-512. Preferably, a symmetric algorithm is employed, so that the endpoint device 106 is able to reverse the transformation after generating the same transformation/encryption key from combined values of the session-specific factors. An eavesdropper, however, will be unable to perform the reverse transformation, without knowledge of the values of the session-specific factors that are shared by the authentication server 108 and the endpoint device 106, but never transmitted via the network 102.

Accordingly, at step 410 the key comprising the combined, and optionally hashed, values of the session-specific factors are applied to the code values of the security matrix 402 resulting in the transformed security matrix 412, which is provided for use at the transmission step 208.

Figure 5:
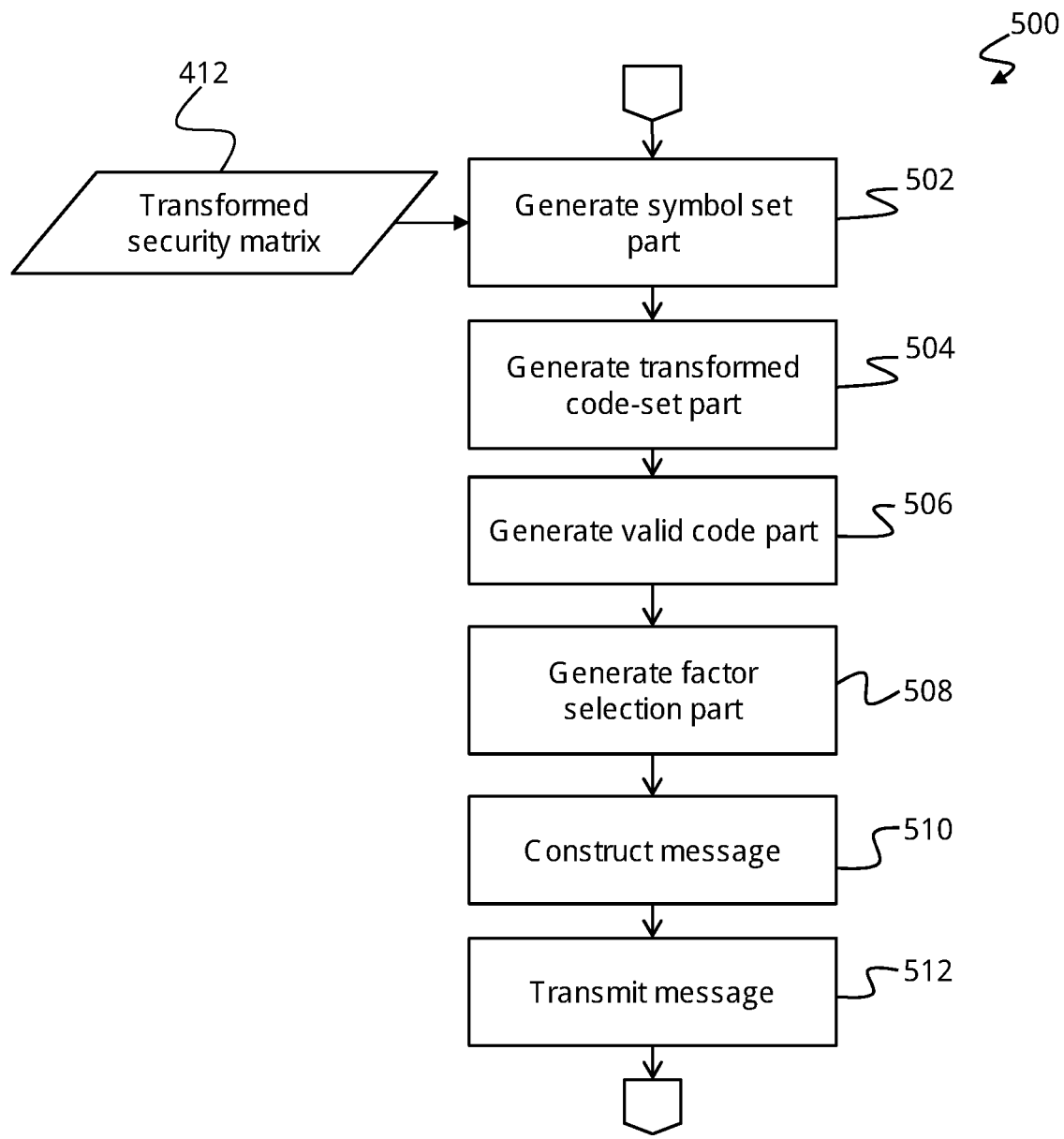
FIG. 5 is a flowchart of a process of constructing a session-specific challenge mention according to the first embodiment.

FIG. 5 is a flowchart 500 illustrating a process of constructing a session-specific challenge message for transmission in the transmission step 208. The input to the process 500 is the transformed security matrix 412. At step 502 a symbol set part of the message is generated, based upon the symbol set included in the security matrix 412. Similarly, at step 504 a transformed code set part of the message is generated based upon the transformed code values within the transformed security matrix 412.

In accordance with the presently described embodiment, a valid code part is generated at step 506. The purpose of the valid code part of the message is to communicate to the endpoint device 106 the complete set of valid code values, for example the decimal digits zero to nine. The way in which this information may be employed by the endpoint device 106 is described in greater detail below with reference to FIG. 7.

At step 508, a factor selection part of the message is generated, to inform the endpoint device 106 of the session-specific factor types that are to be used for reversing the transformation of the code values. Note that the values of the session-specific factors are not in the message constructed by the process 500, but instead comprise shared 'secret' information between the authentication server 108 and the endpoint device 106.

At step 510, the message parts are combined in order to construct the complete challenge message, which is then transmitted at step 512.

Figure 6:
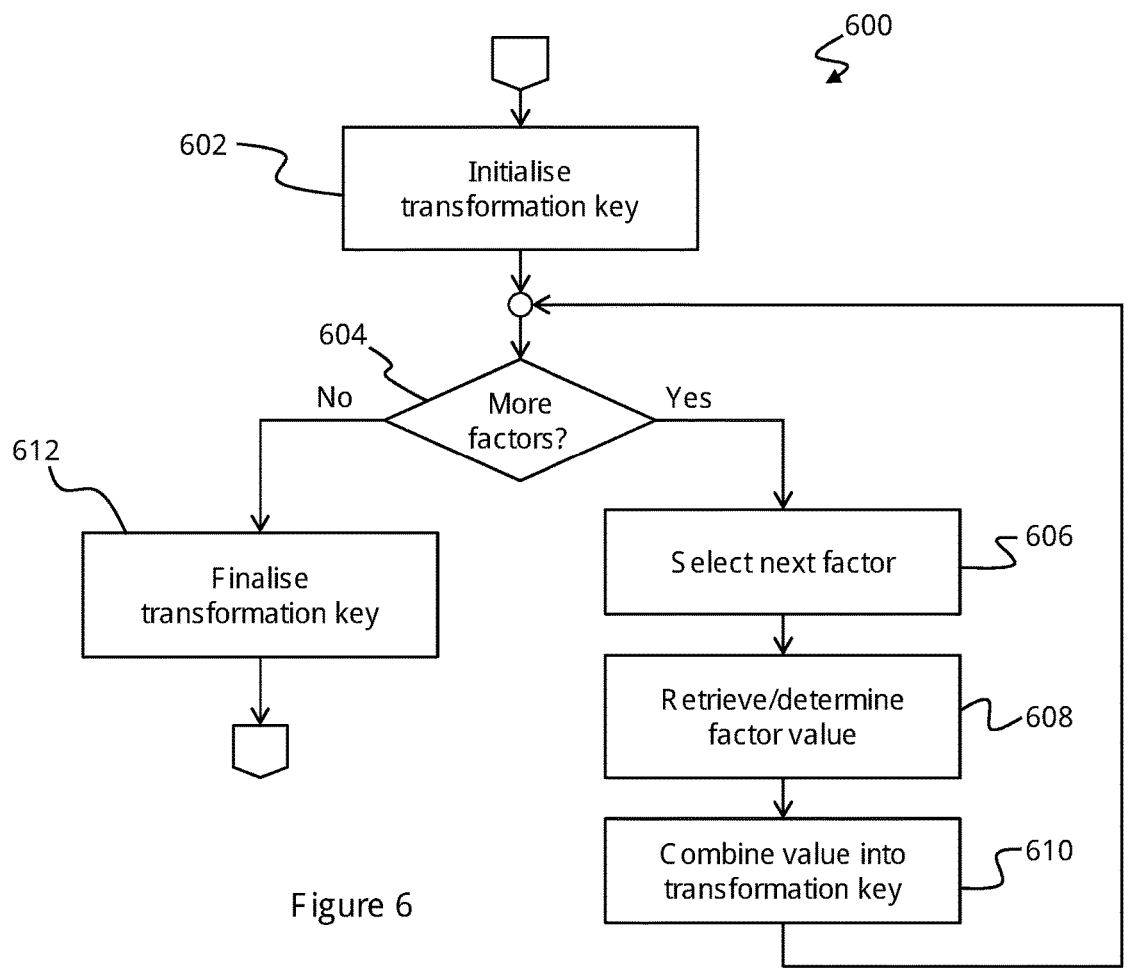
FIG. 6 is a flowchart illustrating an exemplary method for generating a session-specific transformation/encryption key according to the first embodiment.

Turning now to FIG. 6, there is shown a flowchart 600 illustrating an exemplary method for generating a session-specific transformation/encryption key based upon one or more session-specific factors. The method 600 may be used at step 408 of the transformation process 400 in the authentication server 108, and may then similarly be employed by the endpoint device 106 in order to generate the key for performing the corresponding inverse transformation.

At step 602, storage for containing the generated key is initialised. This may involve clearing a corresponding block of memory, or initialising a block of memory to some other value known to both the authentication server 108 and the endpoint device 106. In some cases, the initialisation value may itself be session-specific, e.g. based upon a unique session ID, or upon network addresses of the authentication server 108 and endpoint device 106.

In the exemplary process 600 an iterative algorithm is used to combine multiple session-specific factor values. Accordingly, at decision step 604 a check is performed to determine whether there are further factor values still to be combined. If so, the next factor is selected at step 606, and the corresponding factor value is retrieved or determined at step 608. At step 610, the new factor value is combined, e.g. by concatenation or other algorithmic method, into the transformation key. Control then returns to the decision step 604, to determine whether there are more factor values to be determined and combined.

Once all factor values have been incorporated, an optional finalisation step 612 is executed. For example, a finalisation step may comprise computing a hash value of concatenated factor values to produce a key of known length to be used as part of the transformation or encryption process applied to the code values in the security matrix 402.

Figure 7:
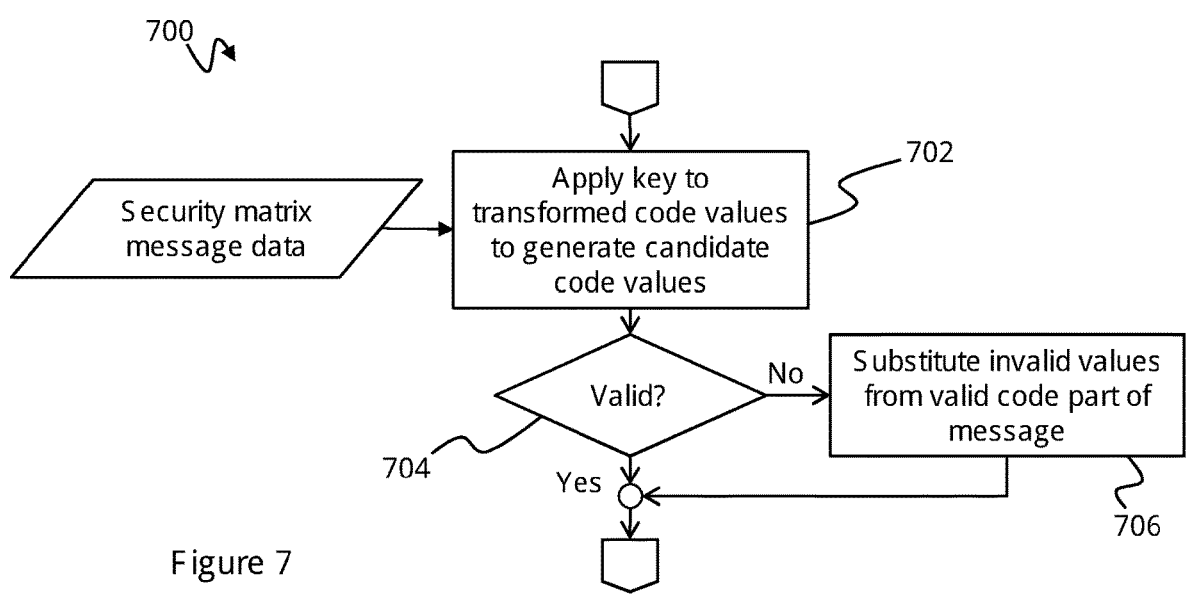
FIG. 7 is a flowchart illustrating an exemplary session-specific inverse transformation process according to the first embodiment.

FIG. 7 is a flowchart 700 illustrating a session-specific inverse transformation process that may be performed at an endpoint device 106, according to embodiments of the invention. At step 702 the transformation key, which is obtained according to the same process 600 as was employed by the authorisation server 108, is applied to the transformed code values in an inverse transformation, in order to generate candidate code values. Note that these are identified as 'candidate code values', since any mismatch between the session-specific factor values applied by the authentication server 108 and by the endpoint device 106 (e.g. in the case of an attempted fraudulent authentication) will result in the generation of incorrect and/or invalid code values.

In particular, the application of an incorrect transformation key in the inverse transformation process may result in one or more candidate code values that are invalid code values. For example, if code values are limited to the decimal digits zero to nine, an invalid inverse transformation may result in other characters or symbols being generated. A check is performed for any such invalid code values, at step 704. The invalid code part of the challenge message, generated at step 506, may be used by the endpoint device 106 in order to identify such invalid code values. If invalid values are present, they are replaced at step 706 with valid codes selected from the valid code part of the challenge message. The selection may be random, or performed via any other suitable method. As a result of this replacement step, the user will always be presented with a security matrix that appears valid, and will therefore be unaware of the possibility that a fraudulent authentication attempt has been detected and thwarted.

Figure 8:
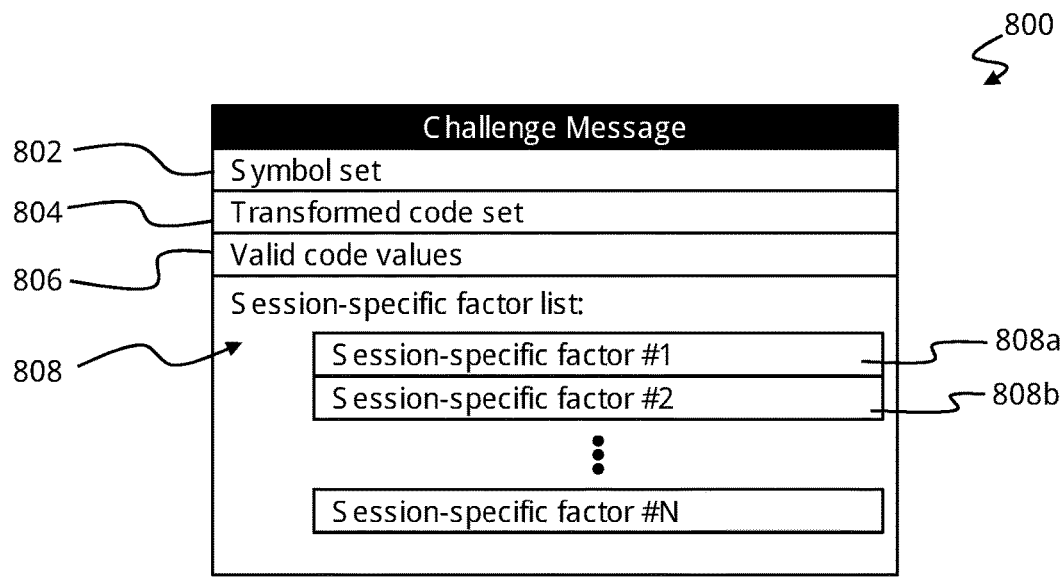
FIG. 8 is a schematic representation of a first challenge message format embodying the invention.

FIG. 8 shows a schematic representation 800 of a challenge message format according to the first embodiment of the invention. The exemplary challenge message 800 comprises a number of fields, corresponding with the message parts constructed as described above with reference to FIG. 5. In particular, the message format 800 comprises a symbol set 802, a transformed code set 804, a valid code set 806, and a session-specific factor list 808. The session-specific factor list 808 comprises one or more subfields identifying the session-specific factors, e.g. 808a, 808b, employed in generating the transformation/encryption key, e.g. as described above with reference to FIG. 6.

Figure 9:
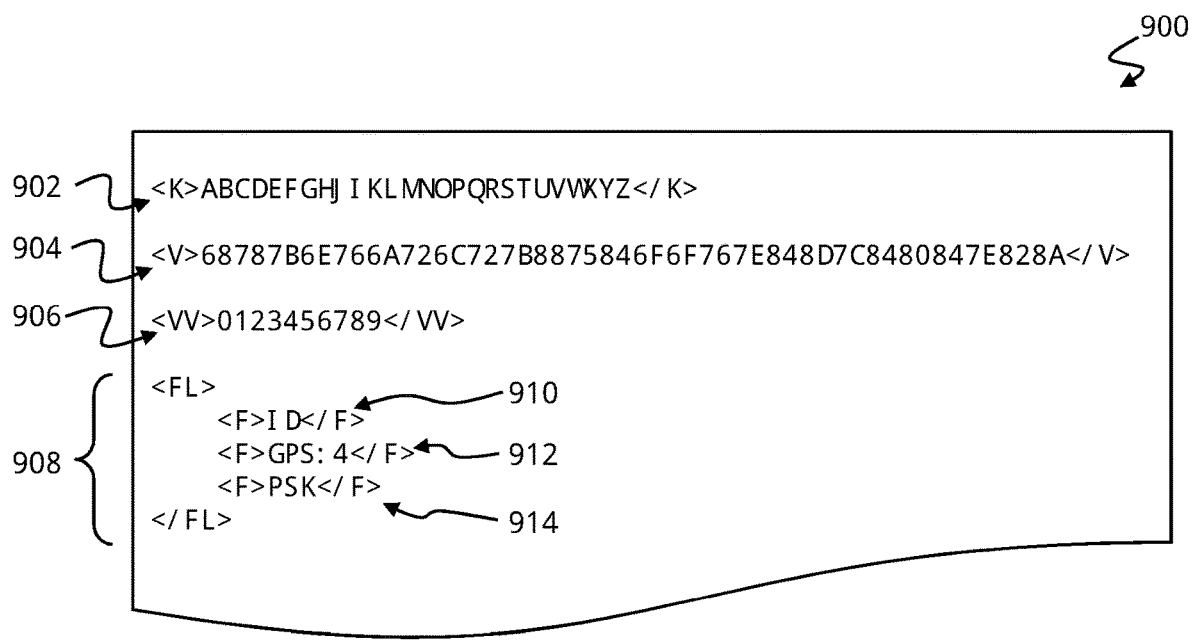
FIG. 9 shows exemplary XML code embodying the message format of FIG. 8.

FIG. 9 shows exemplary XML code 900 embodying a challenge message according to the format 800. In the example shown, the symbol set 902 comprises 26 letters of the alphabet, in upper case. The transformed code set 904 is the result of applying the transformation process 400 to a corresponding set of 26 code values. In the exemplary XML message 900, the transformed code set 904 comprises 26 eight-bit values, each of which is represented as two hexadecimal digits.

The XML code 900 further comprises the set of valid code values 906, which in this example consist of the decimal digits zero to nine.

An XML element 908 encloses the list of session-specific factors 910, 912, 914. In this example, three factors are identified, in which 'ID' represents an identifier of the current user, 'GPS:4' defines a factor consisting of the GPS coordinates of the endpoint device, to four decimal places of precision, and 'PSK' represents a factor consisting of a pre-shared key known to both the endpoint device 106 and the authentication server 108.

In the example represented by the XML code 900, the transformed code set 904 will be converted back to the correct original code set if:

the correct user ID is being used on the endpoint device;
the location of the endpoint device as represented by GPS coordinates with four decimal place precision, matches an authorised location known to the authentication server 108; and
the pre-shared key employed by the endpoint device matches the key employed by the authentication server, e.g. the software installed on the endpoint device is from a legitimate, trusted and authorised source.

Figure 10:
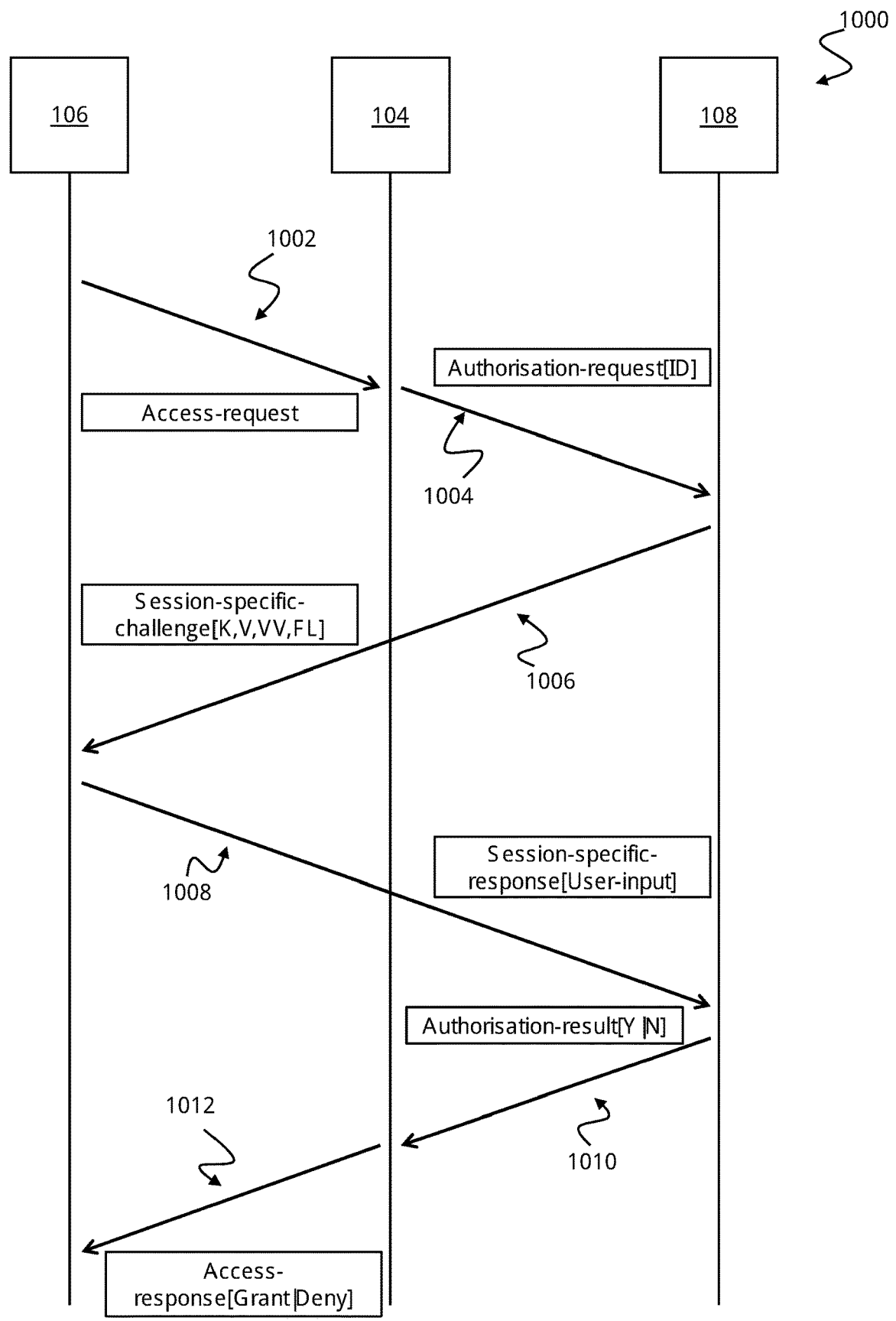
FIG. 10 shows a timeline of communications between and endpoint device, a secure system and an authentication server according to the first embodiment.

Turning now to FIG. 10, there is shown a timeline 1000 of communications between the endpoint device 106, the secure system 104, and an authentication server 108 embodying the invention. An access request 1002 is transmitted from the endpoint device 106 to the secure server 104, and a corresponding authorisation request 1004, which may include a user ID or other identifying information provided by the endpoint device user, is transmitted from the secure system 104 to the authentication server 108. At this point, it may be assumed that the authentication server 108 is able to identify both the particular secure system 104 to which access is requested, and the user requesting access via the endpoint device 106.

A session-specific challenge message 1006 is then transmitted from the authentication server 108 to the endpoint device 106. The session-specific challenge message 1006 has the general message format 800, and in particular may comprise XML code such as the code 900 illustrated in FIG. 9.

The endpoint device 106 then inverts the transformation in order to recover the original sequence of code values, and displays the security matrix comprising pairs of keyword symbols and code values to the user of the endpoint device. The user enters code values corresponding with the user keyword, and a corresponding session-specific challenge response 1008 is transmitted from the endpoint device 106 to the authentication server 108.

The authentication server 108 then performs validation of the code sequence entered by the user, and generates and transmits an authorisation result message 1010 to the secure system 104. The authorisation result message 1010 will indicate whether or not the user successfully authenticated. A corresponding access response message 1012, indicating whether the endpoint device 106 is granted or denied access to the secured system 104, is then transmitted.

The timeline 1000 may be interpreted more generally as a representation of communications between three processing units, independently of the specific combinations of location, hardware and software used to implement each unit. A first processing unit corresponds with the authentication server 108, which receives the request comprising a unique identifier of the user requiring authentication, generates session-specific authentication data (i.e. the challenge), and transmits the authentication data to a second processing unit corresponding with the endpoint device 106. The second processing unit generates transformed authentication data that is characteristic of the authentication session and of the user, and transmits this to a third processing unit for verification. In the embodiment represented by the timeline 1000, the third processing unit is an executable code module which executes on the same authentication server hardware platform 108 as the first processing unit, however in general this function may reside wholly or partially elsewhere, such as with an API code module executing on the secure system 104, or on another trusted platform.

Figure 11:
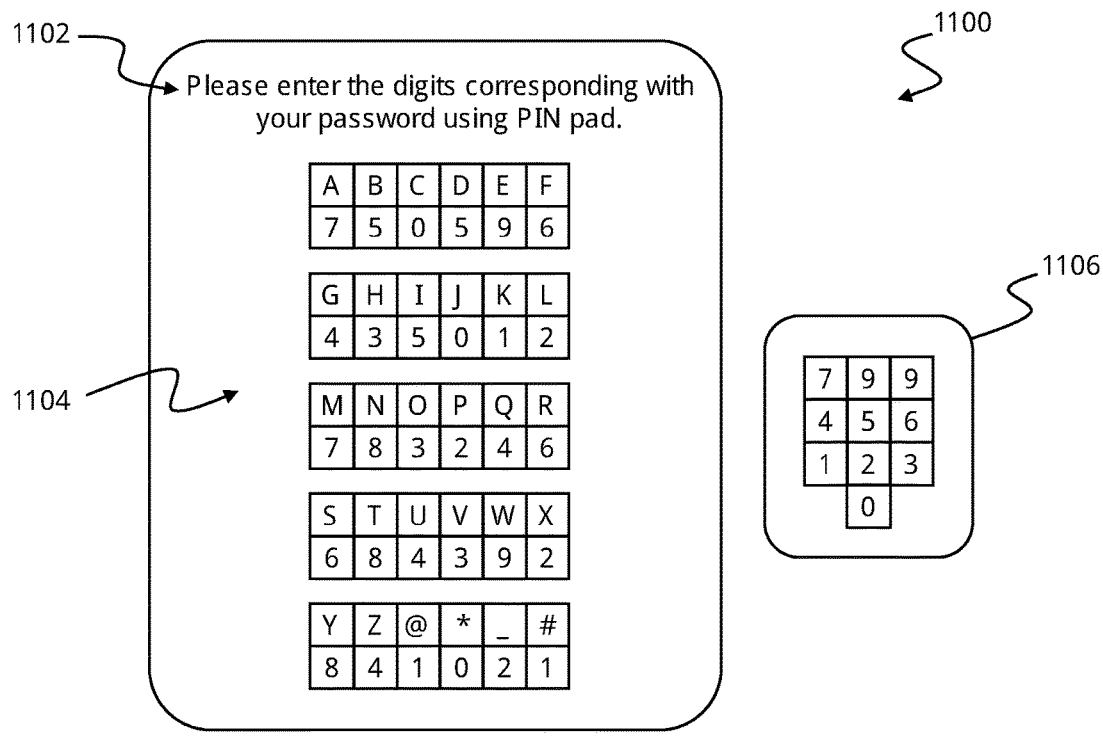
FIG. 11 is a schematic illustration of an endpoint user authentication interface according to the first embodiment.

FIG. 11 is a schematic illustration of an endpoint user authentication interface 1100 embodying the invention. The exemplary interface 1100 includes a prompt 1102, e.g. the text 'please enter the digits corresponding with your password using PIN pad'. Below the prompt 1102, the security matrix 1104 is displayed. The security matrix 1104 comprises paired symbol values and corresponding code values. In the example 1100, there are 30 symbol values comprising 26 letters of the alphabet and four special characters, which are paired with code values comprising the decimal digits zero to nine.

Accordingly, the user can enter the code values corresponding with the symbol values of the user's password via the PIN pad, or numeric keypad 1106. The keypad 1106 may be a physical device, or may be generated on a touchscreen display. Alternative forms of user input may be employed, such as voice recognition, or other means of data entry.

As has been mentioned previously, the authentication server 108 also maintains one or more databases, for example within non-volatile storage 122, or other persistent storage accessible to the processor 120. One or more databases maintained by the authentication server 108 include a database comprising user records, and a database comprising secure system records. User records correspond with users who may be permitted access to one or more secure systems, e.g. 104. Secure system records correspond with one or more secure systems, e.g. 104, for which the authentication server 108 provides authentication services.

Figure 12:
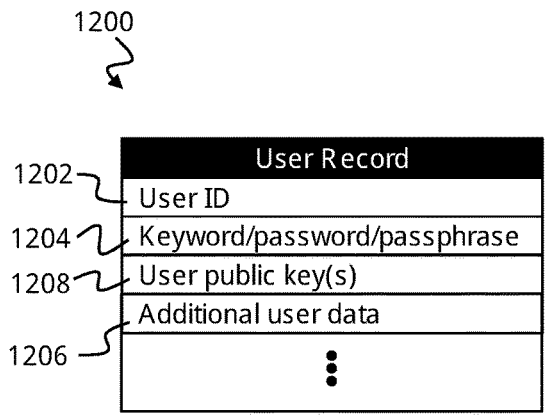
FIG. 12 shows an exemplary user record.

FIG. 12 shows schematically the contents of an exemplary user record 1200, which may be maintained in a database by the authentication server 108. The exemplary user record 1200 comprises a user identifier field 1202, and a field 1204 containing the user's keyword/password. For additional security, the keyword/password filed 1204 may be encrypted until the user's keyword is required by the authentication server 108 for authentication of attempted access by the user to a secure system 104. The user record 1200 may contain one or more user information fields 1206. Additional user information fields 1206 may include personal information, such as the user's real name, contact details, and so forth, and/or may contain other system-specific information, such as authorisation expiry dates or any other information that may be required in a specific implementation of the invention. Also shown is a field 1208 for storing one or more public cryptographic keys of the user. While these public keys are not required in the present embodiment, an application of user public keys is described in greater detail below with respect to a further embodiment of the invention and with reference to FIGS. 15 to 22.

Figure 13:
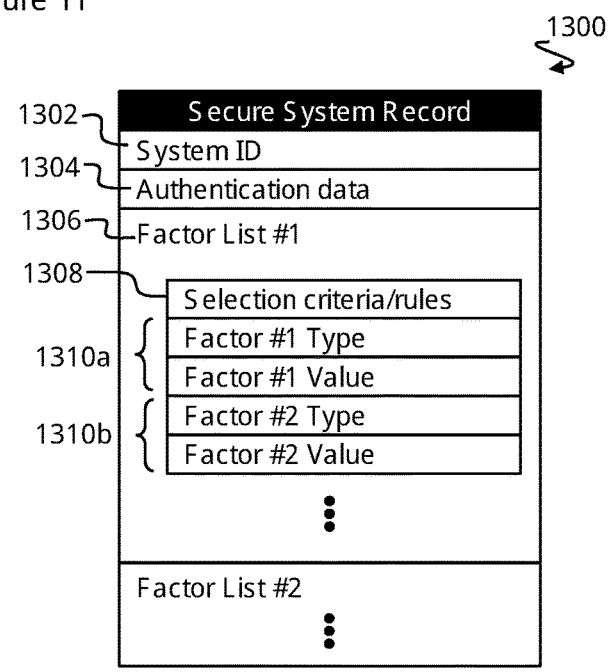
FIG. 13 shows an exemplary secure system record.

FIG. 13 illustrates schematically a secure system record 1300. A secure system record 1300 may comprise a system identifier 1302, corresponding with a particular secure system 104, and may further comprise authentication information 1304. Authentication information 1304 may comprise, for example, a password, public key, or other information that can be used by the authentication server 108 in order to identify and verify requests from a secure system, e.g. 104.

Each secure system record 1300 further contains one or more factor lists 1306. A factor list 1306 may comprise selection criteria 1308. For example, a particular factor list may be employed for a particular endpoint device or location, a particular user, or at particular times of day. An appropriate factor list may therefore be selected by the authentication server 108, in relation to a corresponding secure system 104, by matching parameters of the current authentication request and/or context against the selection criteria 1308.

Each factor list 1306 comprises one or more factor entries, e.g. 1310*a*, 1310*b*. Each factor entry comprises a factor type (e.g. 'ID', 'GPS:4', 'PSK', as exemplified in FIG. 9). Where required, a factor entry may also comprise a factor value corresponding with the factor type. Factor values may comprise, for example, a permitted user ID, an authorised endpoint location, or the value (optionally encrypted for additional security) of a pre-shared key.

An authentication server 108 which maintains secure system records 1300 may be configured for a very wide variety of different use cases.

In one exemplary use case, the secure system 104 may provide access to critical records which are to be available only within a particular secure building. This can be implemented by using a location factor with a value corresponding with the building location. If the location of the endpoint device 106 does not match the corresponding factor value, authentication will fail and access will be denied. Alternative factor lists may be provided for use in association with fixed terminals that are physically located within the building. For example, for each such fixed terminal a factor list may be provided having one or more factor types corresponding with physical parameters of the terminal such as MAC address, and/or other unique hardware component identifier. Accordingly, attempts to access the secure system 104 from such terminals can be successfully authenticated, even though the fixed terminals may not generally have the ability to independently determine their location.

In another exemplary use case, a secure system 104 may be a secure computing platform, e.g. an office server, to which access may only be permitted from authorised, business-supplied, endpoint devices. For example, an employee may be permitted to access the server 104 from a company laptop based upon a MAC address of the laptop, and/or other unique hardware identification numbers. By combining a number of hardware-based factors, the authentication server 108 may regulate access to the secure system 104 based upon unique hardware signatures of endpoint devices 106, even if a malicious user attempts to spoof the system, e.g. by changing the MAC address of a network interface on an unauthorised device.

Figure 14:
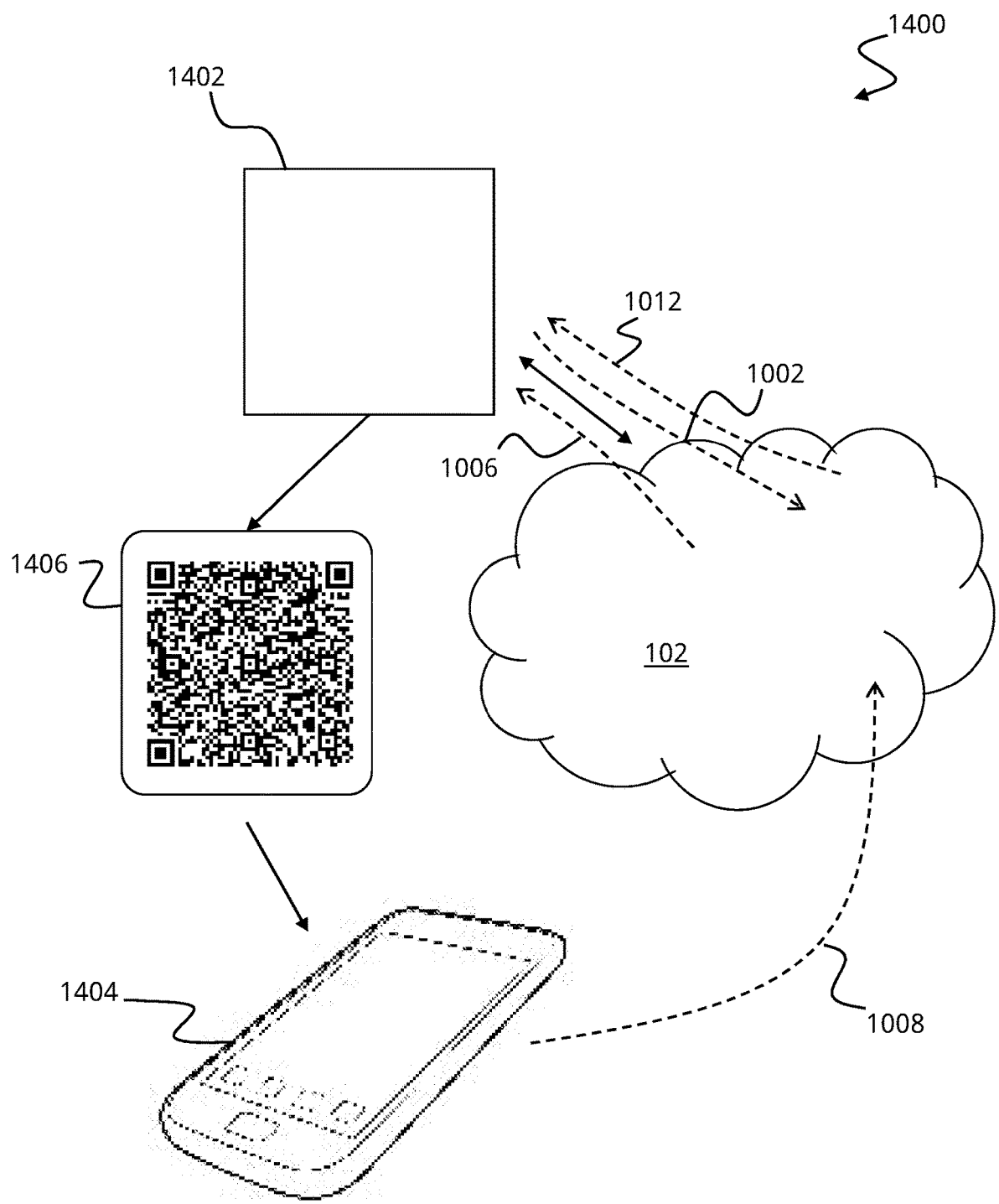
FIG. 14 is a schematic diagram illustrating an alternative user authentication system and method embodying the invention.

Turning to FIG. 14 there is shown a schematic diagram 1400 illustrating an alternative user authentication system and method embodying the invention. In the embodiment 1400 an endpoint device 1402 is distinct from a user device 1404. The user device 1404 may be, for example, a portable device such as a smartphone or tablet. The fixed endpoint device 1402 includes a display 1406. When the user requests access, the session-specific challenge message 1006 is converted by the endpoint device 1402 into a machine-readable code, such as a QR code.

Using an application installed on the portable device 1404, the user scans the machine-readable code, which is decoded by the application. The application then implements the inverse transformation of the transformed code values, and displays the resulting security matrix to the user. The user enters the sequence of code values corresponding with their keyword into the portable device 1404. The resulting session-specific response 1008, comprising the code entered by the user, is transmitted to the authentication server 108. The application on the user device 1404 may be configured with identifying information of the authentication server or may obtain the relevant identifying information from the code acquired from the endpoint device display 1406. In the event that authentication is successful, the user is then provided with access to the secure system 104 via the endpoint device 1402.

The embodiment 1400 accordingly has the advantage of providing 'arm's length' authentication, via a user's personal device 1404, wherein the user enters authentication information only into their own device 1404, and never into the endpoint device 1402. This arrangement enables enhanced multifactor authentication, depending upon something the user has (their portable device 1404), something the user knows (their keyword), along with any further factors that may be defined in a factor list corresponding with the secure system 104 that the user is attempting to access.

A further enhancement to multifactor authentication, based upon a portable digital device as a 'possession factor' of a user, will now be described by way of a further exemplary embodiment of the invention, with reference to FIGS. 15 to 22. The general system configuration of this further embodiment remains as shown 100 in FIG. 1, however the endpoint device 106 is now a portable personal device such as a dedicated digital access device running suitable software or, conveniently, a smartphone or other personal device having an installed application (i.e. an 'app') providing the required instruction code embodying required functionality of the invention. Furthermore, while the device 106 may be operated by the user to request access to a secure system, an access request may be generated independently of the device. For example, the user may request access to an online system from a web browser executing on a desktop computer by entering only a unique identifier, such as a user name, thereby triggering a remote secure system 104 to generate an authentication request to a remote authentication server 108. Communications with the portable device 106, as described in more detail below with reference to FIG. 22, then carry out the authentication method to enable an authentication result to be generated by or to the secure system 104.

Figure 15:
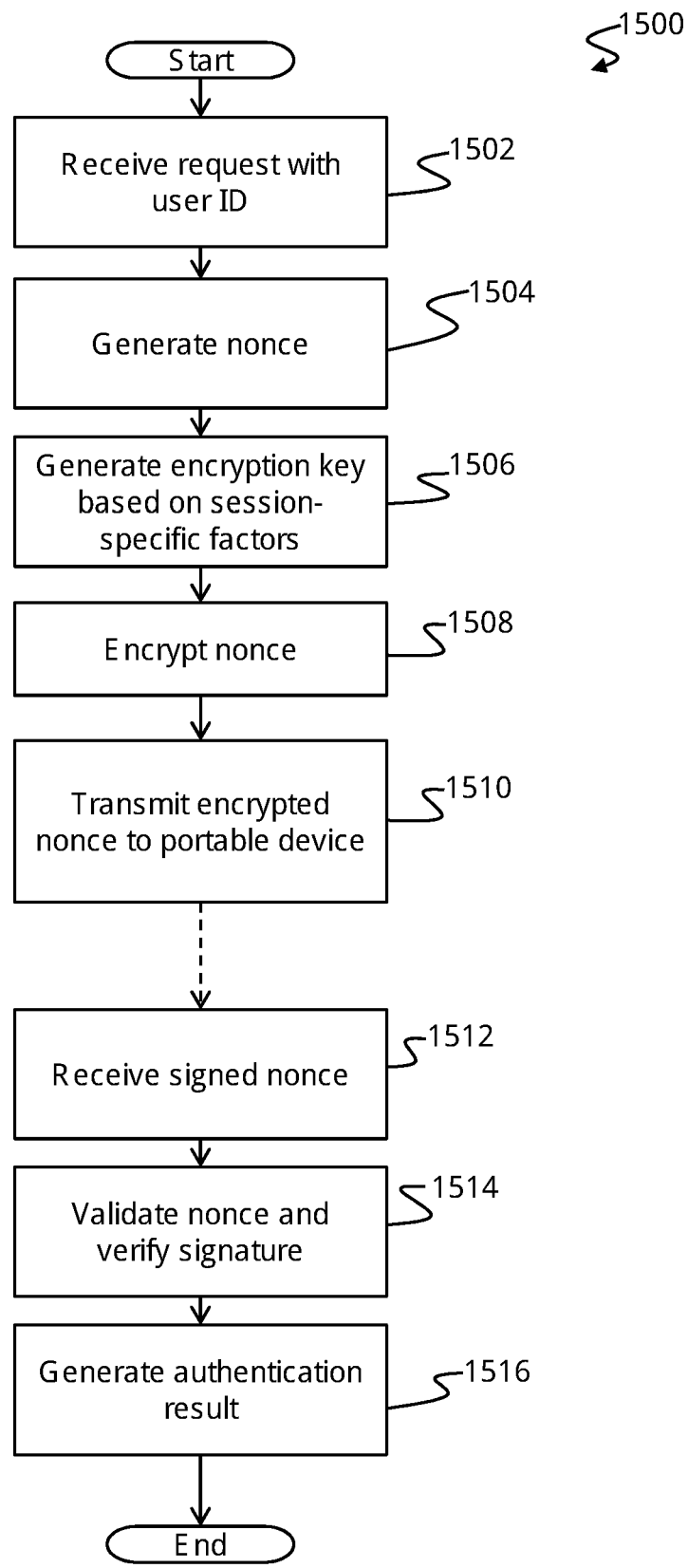
FIG. 15 is a flowchart illustrating a user authentication method performed at an authentication server according to a further embodiment of the invention.

FIG. 15 is a flowchart 1500 showing further details of a user authentication method according to the further embodiment of the invention, from the perspective of the authentication server 108. At step 1502 the authentication server 108 receives an authorisation request from the secure system 104, which includes identifying information of the end-user, such as a user name or other user ID. At step 1504, the authentication server 108 generates a session-specific one-time code word, commonly known in the art as a 'nonce', which may be, for example, a random number of an appropriate length, e.g. 256 or 512 bits.

At step 1506, the authentication server 108 generates an encryption key based upon one or more session-specific factors. Further discussion of this step is provided below, with reference to FIG. 17. The encryption key is used to encrypt the nonce at step 1506, for example using a symmetric cipher such as DES, 3DES, AES-256, AES-512 or Blowfish. A challenge message comprising the encrypted nonce, and other relevant information, is then transmitted to the portable device 106, as discussed in greater detail below with reference to FIG. 18. Subsequently, at step 152, the authentication server 108 receives a challenge response message from the portable device 106, which comprises a digitally signed copy of the original, decrypted, nonce. In the event that the endpoint device 106 has successfully replicated the key generation performed by the authentication server 108 at step 1506, and has applied the user's private key for signing, the authentication server 108 will be able to validate the nonce and verify the signature using a public key 1208 of the user at step 1514. From this, an authentication result 1516 is generated.

Figure 16:
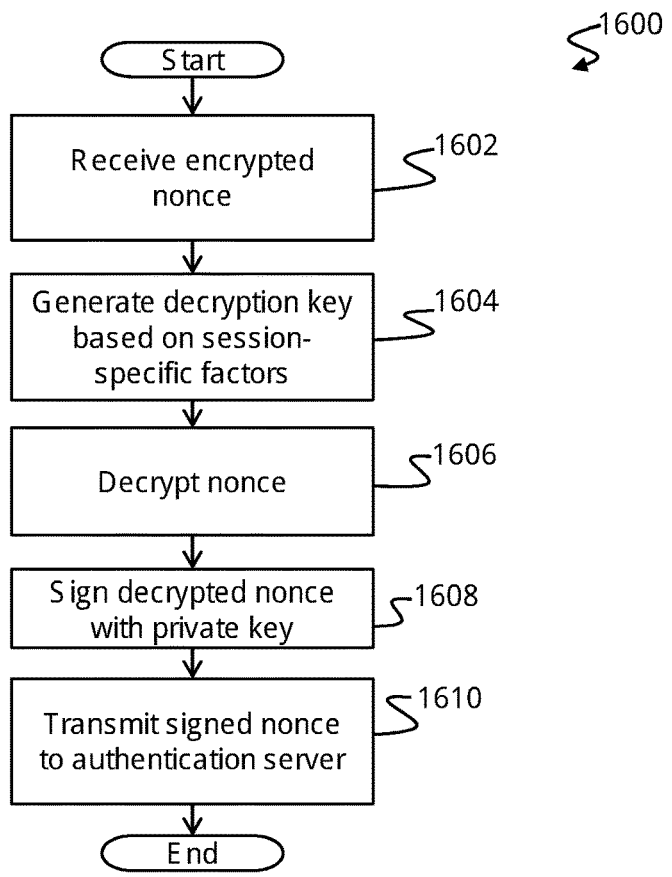
FIG. 16 is a flowchart illustrating a user authentication method as performed at a portable device according to the further embodiment.

Turning now to FIG. 16, there is shown a flowchart 1600 of a user authentication method as performed at a portable device 106, such as a smartphone executing an app comprising code embodying the invention. In particular, at step 1602 the device 106 receives the challenge message including the encrypted nonce from the authentication server 108. At step 1604, the device 106 applies the same session-specific factors employed by the authentication server 108 at step 1506 in order to replicate the symmetric encryption/decryption key used to encrypt the nonce. At step 1606 this key is used to decrypt the nonce. The decrypted nonce is then signed, at step 1608, using a private key of the user that is held securely within the portable device. For example, in the that case the portable device is a smartphone, the signing step may be carried out securely using features provided by the Android Keystore System, the iOS Keychain Services, or equivalent functionality supported under other operating systems and hardware platforms. The resulting decrypted and signed nonce is then transmitted to the authentication server 108 at step 1610.

Figure 17:
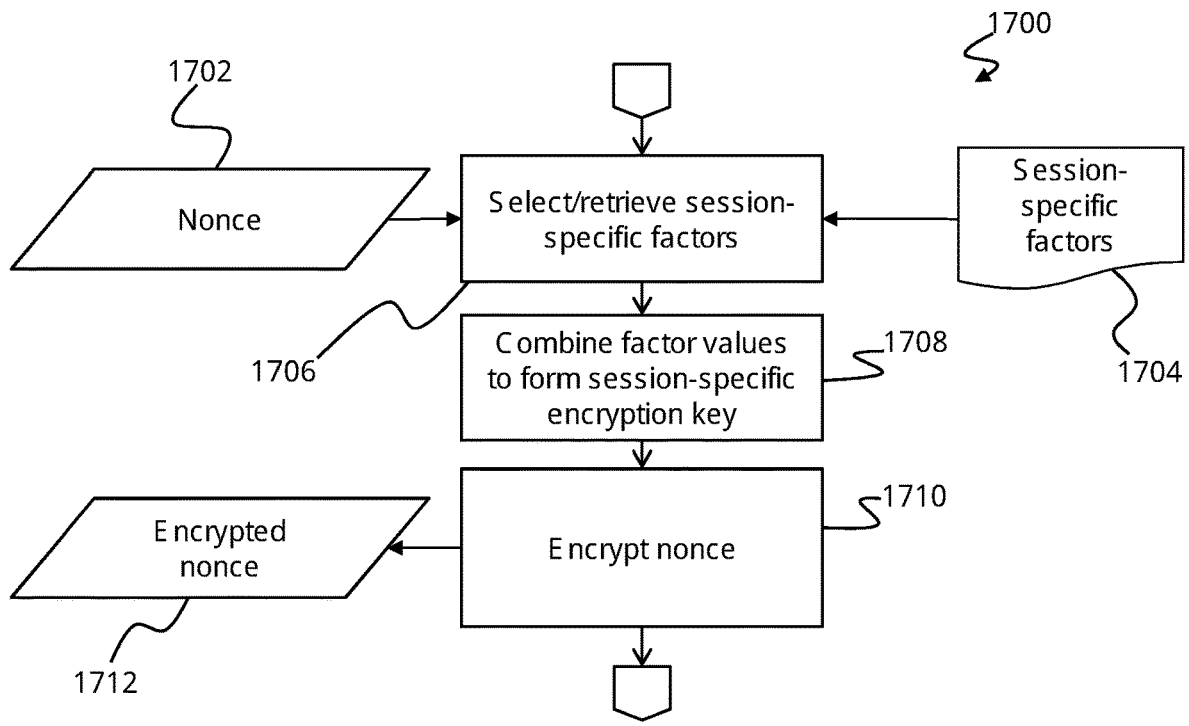
FIG. 17 is a flowchart illustrating a session-specific encryption process according to the further embodiment.

FIG. 17 shows a flowchart 1700 illustrating a session-specific encryption process, e.g. as carried out by the authentication server 108 at steps 1506 and 1508, according an embodiment of the invention. The input to the process 1700 is the nonce 1702, as generated at step 1704. In particular, at step 1706 one or more session-specific factors 1704 is identified and selected or retrieved, in like manner to the first embodiment as described previously with reference to FIGS. 4 and 13. At step 1708, the factor values retrieved or determined at step 1706 are combined to form a session-specific encryption key, which is used at step 1710 to generate the encrypted nonce 1712.

Figure 18:
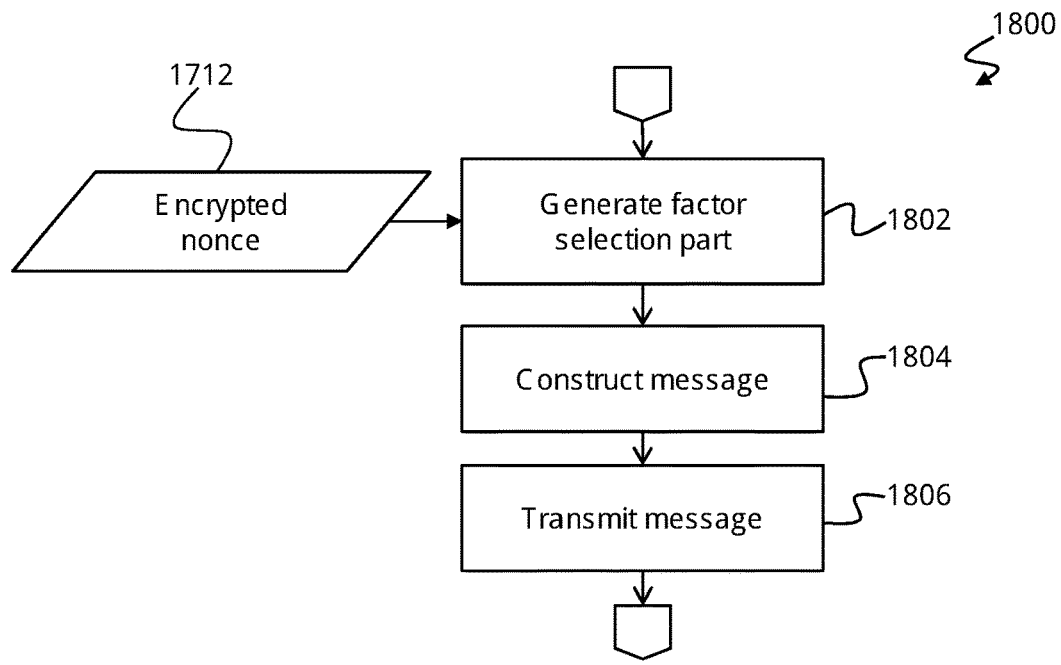
FIG. 18 is a flowchart illustrating a process of constructing a session-specific challenge message according to the further embodiment.

FIG. 18 is a flowchart 1800 illustrating a process of constructing a session-specific challenge message for transmission in the step 1510. The input to the process 1800 is the encrypted nonce 1712. At step 1802, a factor selection part of the message is generated, to inform the portable device 106 of the session-specific factor types that are to be used in generation of the decryption key. As in the first embodiment described above, the 'correct' values of the session-specific factors are not in the message constructed at step 1804 by the process 1800, but instead comprise shared 'secret' information between the authentication server 108 and the portable device 106. At step 1806, the completed challenge message is transmitted.

Figure 19:
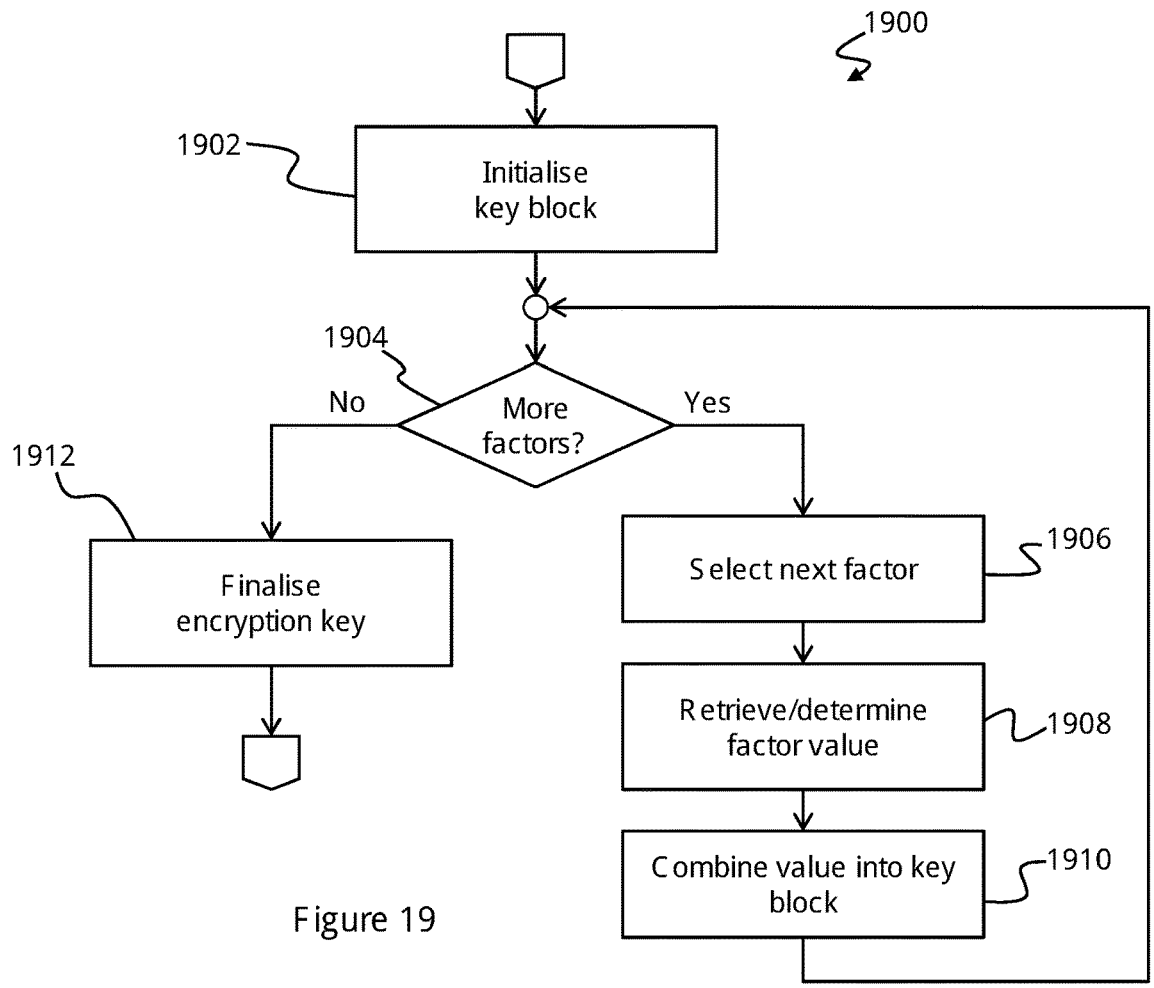
FIG. 19 is a flowchart illustrating an exemplary method for generating a session-specific encryption/decryption key in the methods of FIGS. 15 and 16.

Turning now to FIG. 19, there is shown a flowchart 1900 illustrating an exemplary method for generating a session-specific encryption/decryption key based upon one or more session-specific factors. The method 1900 may be used at step 1506 of the transformation process 1500 in the authentication server 108, and may then similarly be employed by the portable device 106 at step 1604 of the response generation process 1600. At step 1902, storage for containing the generated key is initialised. In the exemplary process 1900 an iterative algorithm, i.e. steps 1904-1910, is used to combine multiple session-specific factor values in a similar manner to the steps 604-610 in the process 600. Once all factor values have been incorporated, a finalisation step 1912 is then executed, which may typically comprise computing a hash value of the combined factor values to produce a key of known length to be used as part of the encryption/decryption process applied to the nonce 1702.

Figure 20:
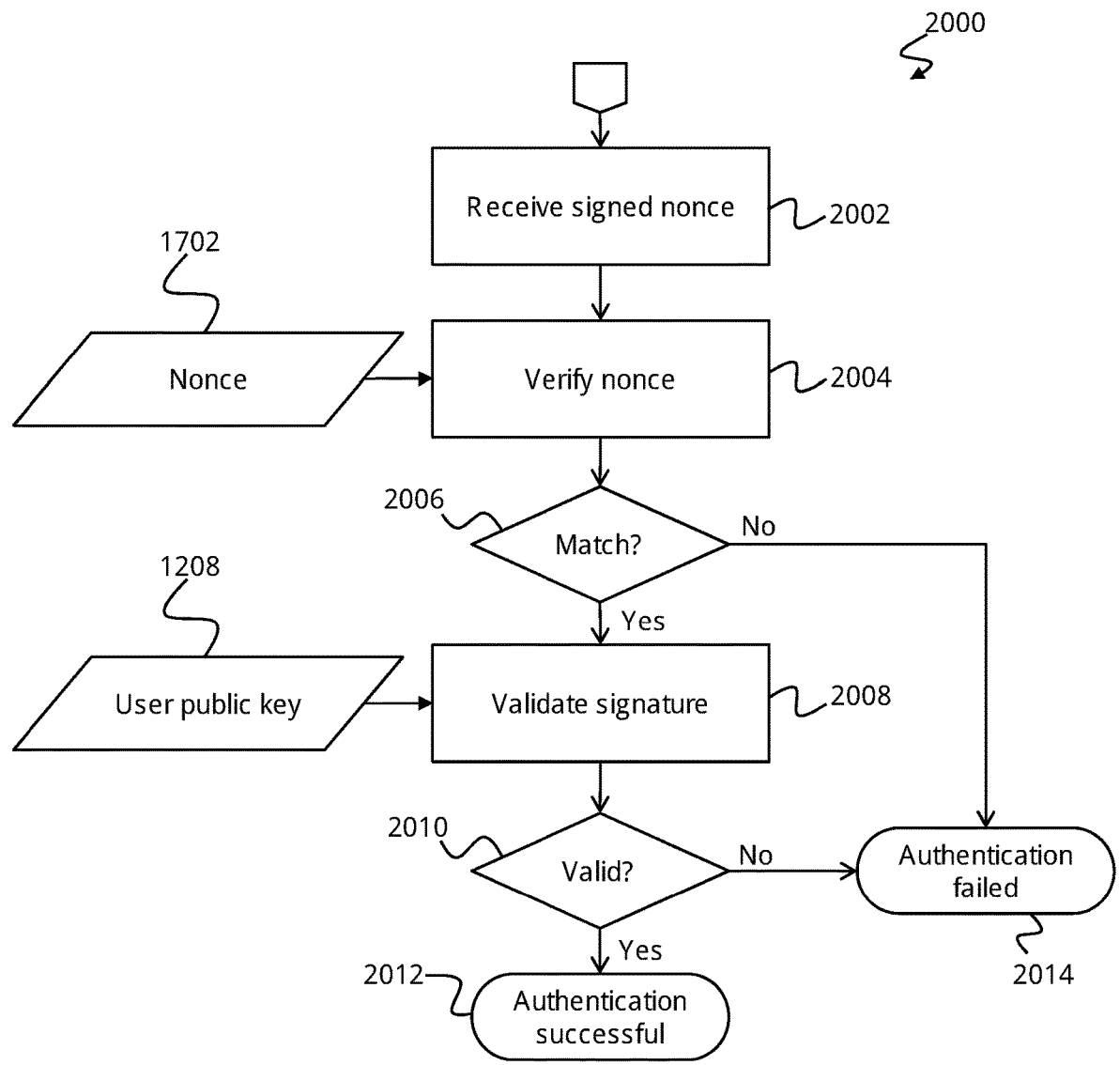
FIG. 20 is a flowchart illustrating an exemplary process of authentication performed by the authentication server in response to receiving a response message generated by a portable device.

FIG. 20 is a flowchart 2000 illustrating a process of authentication performed by the authentication server 108 in response to receiving 2002 a message comprising the decrypted and signed nonce generated by the portable device 106. Firstly, at step 2004, the decrypted nonce is compared with the originally-generated nonce 1702. If found to match, at decision step 2006, the authentication server 108 proceeds to verify that the signature is valid, by applying the user's public key 1208 stored in the user record 1200. If found to match, at decision step 2010, then authentication is deemed successful 2012. If there is a mismatch in either the value of the decrypted nonce, at decision 2006, or in the digital signature, at decision 2010, then authentication fails 2014.

Figure 21:
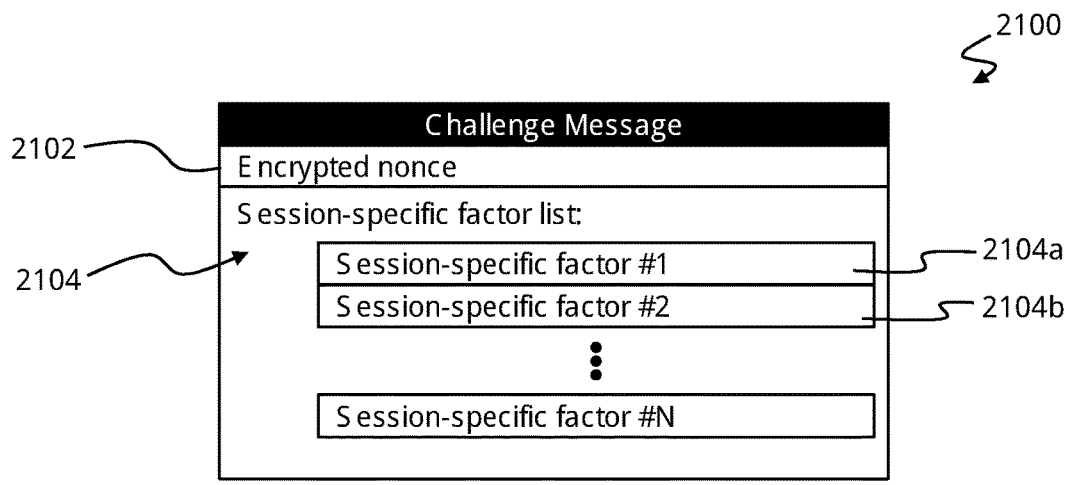
FIG. 21 shows a schematic representation of a challenge message format according to the further embodiment.

FIG. 21 shows a schematic representation 2100 of a challenge message format according to the present embodiment of the invention. The exemplary challenge message 2100 comprises fields corresponding with the message parts constructed as described above with reference to FIG. 18. In particular, the message format 2100 comprises the encrypted nonce 2102, and a session-specific factor list 2104 which, in turn, comprises one or more subfields identifying the session-specific factors, e.g. 2104a, 2104b, employed in generating the encryption/decryption key.

Figure 22:
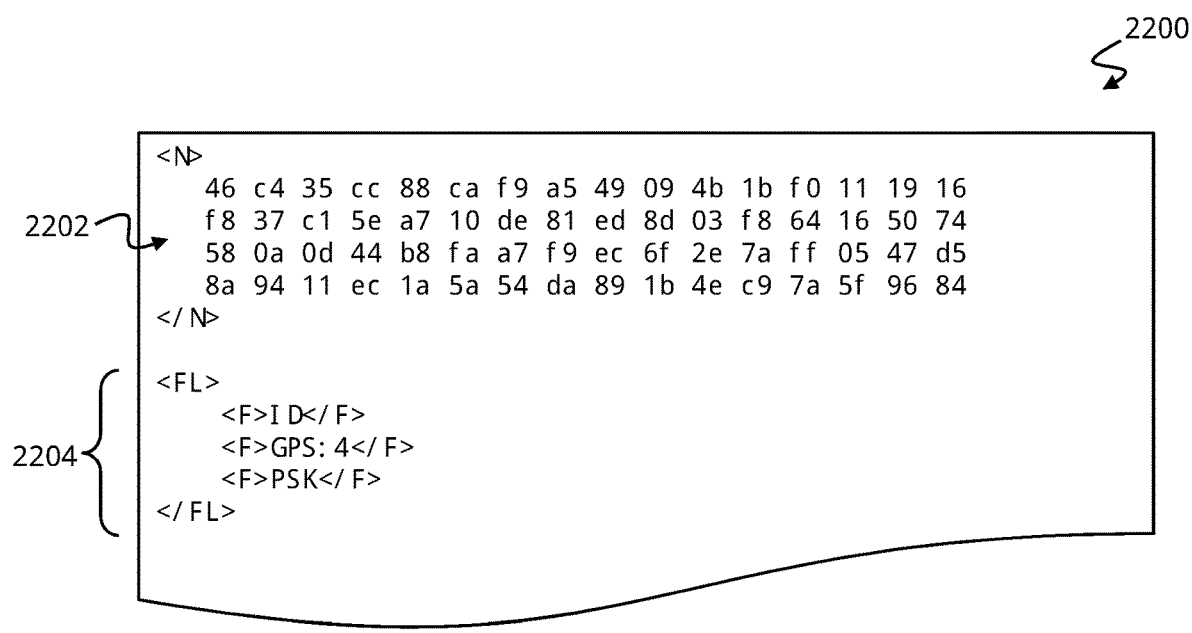
FIG. 22 shows exemplary XML code embodying the message format of FIG. 21.

An equivalent exemplary XML-format message content 2200 is illustrated in FIG. 22. In the example shown, the encrypted nonce 2202 comprises a 512-bit value, represented as 64 8-bit hexadecimal numbers. A list 2204 of session-specific factors is also present, in the same format as has been described previously with reference to FIG. 9.

Figure 23:
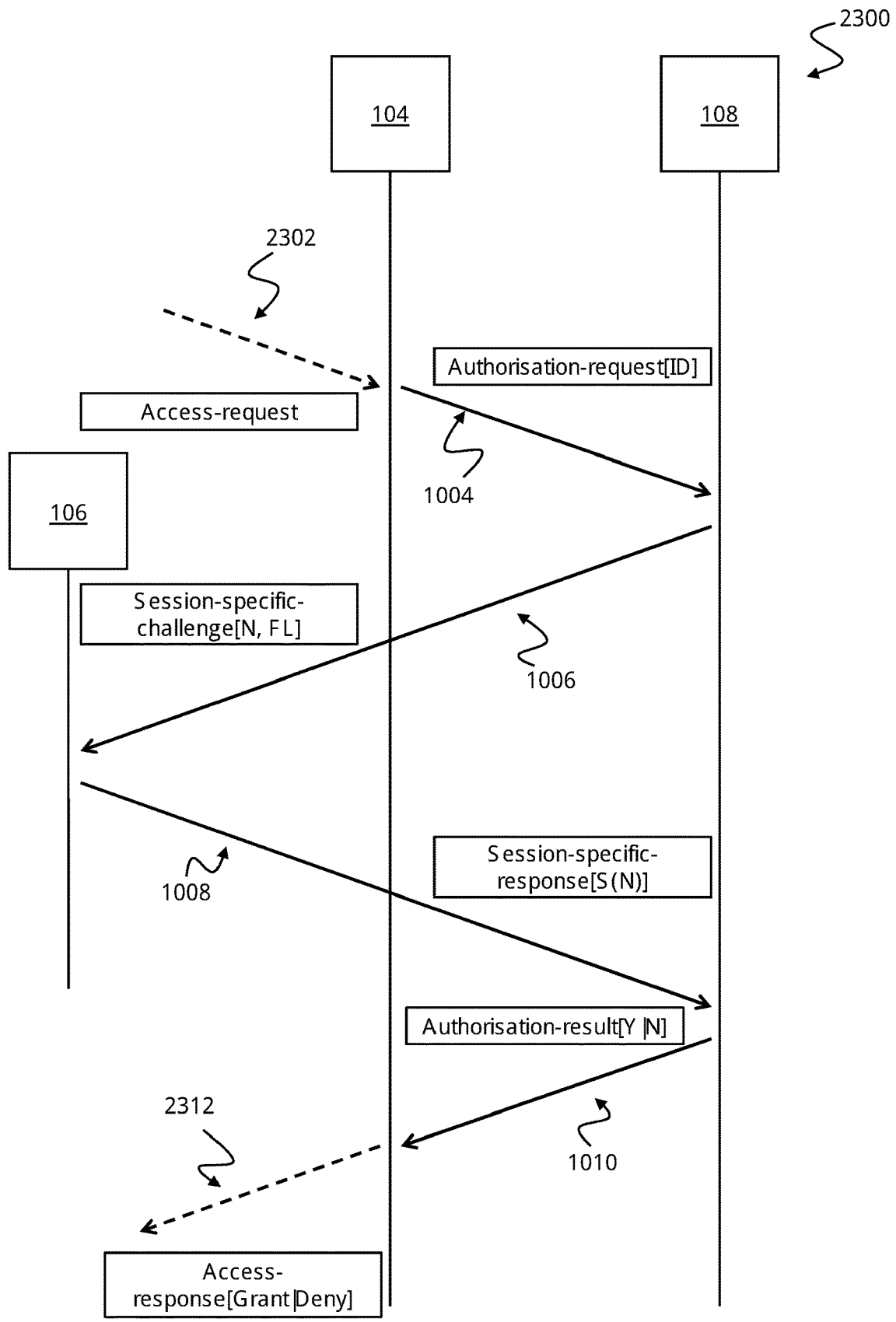
FIG. 23 shows a timeline of communications between and endpoint device, a secure system and an authentication server according to the further embodiment.

Turning now to FIG. 23, there is shown a timeline 2300 of communications between the portable device 106, the secure system 104, and the authentication server 108, according to the present embodiment of the invention. An access request 2302 is received by the secure server 104, and a corresponding authorisation request 1004, which may include a user ID or other identifying information requestor, is transmitted from the secure system 104 to the authentication server 108. A session-specific challenge message 1006 is then transmitted from the authentication server 108 to the portable device 106. In this embodiment, the session-specific challenge message has the general message format 2100, and in particular may comprise XML code such as the code 2200 illustrated in FIG. 22. The endpoint device 106 then applies the session-specific factors (FL) to generate a decryption key to decrypt the encrypted nonce (N), signs the resulting value, and transmits a corresponding session-specific challenge response 1008 to the authentication server 108. The authentication server 108 then performs validation of the signed nonce, as described previously with reference to FIG. 20, and generates and transmits an authorisation result message 1010 to the secure system 104. The secure system 104 uses this result to determine whether or not to grant access 2312 to the requesting user.

It should be appreciated that while particular embodiments and variations of the invention have been described herein, further modifications and alternatives will be apparent to persons skilled in the relevant arts. In particular, the examples are offered by way of illustrating the principles of the invention, and to provide a number of specific methods and arrangements for putting those principles into effect. In general, embodiments of the invention rely upon providing technical arrangements whereby a verification code can be independently generated in two remote locations, and a corresponding transformation/encryption key can also be independently generated, e.g. at an authentication server location and at an endpoint device location. The transformation/encryption key is dependent upon one or more session-specific factors, such that attempts to access a secure system without authority can be thwarted based on a wide range of criteria. Such criteria include, but are not limited to, endpoint device location, an endpoint device hardware signature, time of day, and so forth.

Accordingly, the described embodiments should be understood as being provided by way of example, for the purpose of teaching the general features and principles of the invention, but should not be understood as limiting the scope of the invention, which is as defined in the appended claims.

The invention claimed is:

1. A user authentication method comprising execution, by a distributed processing system, of the steps of:
receiving, at a first processing unit, a request to initiate an authentication session, the request comprising a unique identifier of a user requiring authentication;
the first processing unit acquiring at least one item of authentication data comprising a session-specific one-time code word that is valid during the authentication session;
the first processing unit encrypting the authentication data using an algorithm parameterized by predetermined values of one or more location-dependent session-specific authentication factors;
transmitting the encrypted authentication data to a second processing unit which is associated with a terminal device operated by the user;
the second processing unit decrypting the encrypted authentication data using an algorithm parameterized by context-dependent values of the one or more location-dependent session-specific authentication factors, and applying a cryptographic signature to the decrypted authentication data based upon a private cryptographic key of the user, thereby generating transformed authentication data that is characteristic of the authentication session and of the user;
transmitting the transformed authentication data to a third processing unit;
the third processing unit performing a verification that includes confirming that the transformed authentication data corresponds with the predetermined values of the one or more location-dependent session-specific authentication factors, and applying a public cryptographic key of the user to confirm that the cryptographic signature corresponds with the private cryptographic key of the user; and
the third processing unit generating an authentication result of the authentication session based upon the verification.

2. The method of claim 1 wherein the one or more location-dependent session-specific authentication factors comprises at least one of:
a geographic location of the terminal device operated by the user;
one or more Service Set Identifiers (SSIDs) of wireless networks visible to the terminal device operated by the user;
an SSID of a wireless network to which the terminal device is connected;
identifying information of a mobile cellular carrier to which the terminal device is connected; and
data provided by a local beacon or network-attached device accessible to the terminal device.

3. The method of claim 1 wherein:
the first processing unit comprises instruction code executing on a processor of a service provider computer system and/or a processor of an authentication server system; and
the second processing unit comprises instruction code executing on a processor of the terminal device operated by the user.

4. The method of claim 3 wherein the terminal device operated by the user is a portable device carried by the user.

5. The method of claim 1 wherein the third processing unit comprises instruction code executing on a processor of a service provider computer system and/or a processor of an authentication server system.

6. An authentication system comprising:
a processor;
a network interface, operatively associated with the processor; and
at least one computer-readable storage device, accessible by the processor,
wherein the storage device comprises instruction code executable by the processor and configured to cause the processor to implement a method comprising the steps of:
receiving, via the network interface, a request to initiate an authentication session, the request comprising a unique identifier of a user requiring authentication;
acquiring at least one item of authentication data comprising a session-specific one-time code word that is valid during the authentication session;
encrypting the authentication data using an algorithm parameterized by predetermined values of one or more location-dependent session-specific authentication factors;
transmitting, via the network interface, the encrypted authentication data to a processing unit associated with a terminal device operated by the user; and
receiving, via the network interface, transformed authentication data characteristic of the authentication session and of the user generated by the processing unit associated with the terminal device operated by the user decrypting the
encrypted authentication data using an algorithm parameterized by context-dependent values of the one or more location-dependent session-specific authentication factors, and applying a cryptographic signature to the decrypted authentication data based upon a private cryptographic key of the user,
wherein the transformed authentication data is configured to enable verification that it corresponds with the predetermined values of the one or more location-dependent session-specific authentication factors, and that the cryptographic signature corresponds with the private cryptographic key of the user,
whereby an authentication result may be generated for the authentication session based upon the verification.

7. A portable personal authentication device comprising:
a processor;
a network interface, operatively associated with the processor;

at least one secure storage component containing a private cryptographic key of the user; and at least one computer-readable storage device, accessible by the processor, wherein the storage device comprises instruction code executable by the processor and configured to cause the processor to implement a method, in an authentication session of a user of the authentication device, comprising the steps of:

receiving, via the network interface from an authentication system, encrypted authentication data comprising a session-specific one-time code word that is valid during the authentication session, and which has been encrypted using an algorithm parameterized by predetermined values of one or more location-dependent session-specific authentication factors;

decrypting the authentication data using an algorithm parameterized by context-dependent values of the one or more location-dependent session-specific authentication factors, and applying a cryptographic signature to the decrypted authentication data based upon the private cryptographic key of the user, thereby generating transformed authentication data that is characteristic of the authentication session and of the user;

transmitting, via the network interface to the authentication system, the transformed authentication data, wherein the transformed authentication data is configured to enable verification that it corresponds with the predetermined values of the one or more location-dependent session-specific authentication factors, and that the cryptographic signature corresponds with the private cryptographic key of the user, whereby an authentication result may be generated for the authentication session based upon the verification.

8. The portable personal authentication device of claim 7 wherein the one or more location-dependent session-specific authentication factors comprises at least one of:

a geographic location of the portable personal authentication device operated by the user;

one or more Service Set Identifiers (SSIDs) of wireless networks visible to the portable personal authentication device operated by the user;

an SSID of a wireless network to which the portable personal authentication device is connected;

identifying information of a mobile cellular carrier to which the portable personal authentication device is connected; and data provided by a local beacon or network-attached device accessible to the portable personal authentication device.

9. A non-transitory computer-readable medium comprising stored program instructions which, when executed by a processor of an authentication system, cause the authentication system to implement a method comprising the steps of:

receiving, via a network interface of the authentication system, a request to initiate an authentication session, the request comprising a unique identifier of a user requiring authentication;

acquiring at least one item of authentication data comprising a session-specific one-time code word that is valid during the authentication session;

encrypting the authentication data using an algorithm parameterized by predetermined values of one or more location-dependent session-specific authentication factors;

transmitting, via the network interface, the encrypted authentication data to a processing unit associated with a terminal device operated by the user; and receiving, via the network interface, transformed authentication data characteristic of the authentication session and of the user generated by the processing unit associated with the terminal device operated by the user decrypting the encrypted authentication data using an algorithm parameterized by context-dependent values of the one or more location-dependent session-specific authentication factors, and applying a cryptographic signature to the decrypted authentication data based upon a private cryptographic key of the user, wherein the transformed authentication data is configured to enable verification that it corresponds with the predetermined values of the one or more location-dependent session-specific authentication factors, and that the cryptographic signature corresponds with the private cryptographic key of the user, whereby an authentication result may be generated for the authentication session based upon the verification.

10. A non-transitory computer-readable medium comprising stored program instructions which, when executed by a processor of a portable personal authentication device, cause the device to implement a method comprising the steps of:

receiving, via a network interface of the device from an authentication system, encrypted authentication data comprising a session-specific one-time code word that is valid during the authentication session, and which has been encrypted using an algorithm parameterized by predetermined values of one or more location-dependent session-specific authentication factors;

decrypting the encrypted authentication data using an algorithm parameterized by context-dependent values of the one or more location-dependent session-specific authentication factors, and applying a cryptographic signature to the decrypted authentication data based upon the private cryptographic key of the user, thereby generating transformed authentication data that is characteristic of the authentication session and of the user;

transmitting, via the network interface to the authentication system, the transformed authentication data, wherein the transformed authentication data is configured to enable verification that it corresponds with the predetermined values of the one or more session-specific authentication factors, and that the cryptographic signature corresponds with the private cryptographic key of the user, whereby an authentication result may be generated for the authentication session based upon the verification.

* * * * *